(12) United States Patent
Higai et al.

(10) Patent No.: US 12,054,113 B2
(45) Date of Patent: Aug. 6, 2024

(54) AUTOMOTIVE CRASHWORTHINESS ENERGY ABSORPTION PART AND METHOD FOR MANUFACTURING THE SAME

(71) Applicant: JFE STEEL CORPORATION, Tokyo (JP)

(72) Inventors: Kazuhiko Higai, Tokyo (JP); Tsuyoshi Shiozaki, Tokyo (JP); Yoshikiyo Tamai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 293 days.

(21) Appl. No.: 17/607,909

(22) PCT Filed: Dec. 27, 2019

(86) PCT No.: PCT/JP2019/051364
§ 371 (c)(1),
(2) Date: Nov. 1, 2021

(87) PCT Pub. No.: WO2020/240904
PCT Pub. Date: Dec. 3, 2020

(65) Prior Publication Data
US 2022/0219631 A1   Jul. 14, 2022

(30) Foreign Application Priority Data

May 28, 2019   (JP) .................................. 2019-099110

(51) Int. Cl.
*B60R 19/18*   (2006.01)
*B62D 21/15*   (2006.01)
(Continued)

(52) U.S. Cl.
CPC ............ *B60R 19/18* (2013.01); *B62D 21/152* (2013.01); *B62D 25/08* (2013.01); *B62D 29/005* (2013.01)

(58) Field of Classification Search
CPC ......... B60R 19/18; B60R 19/22; B60R 19/34; B60R 2019/186; B60R 2019/1866;
(Continued)

(56) References Cited

U.S. PATENT DOCUMENTS 6,096,403 A * 8/2000 Wycech .............. B29C 44/1228
428/35.8
6,474,726 B1 * 11/2002 Hanakawa ............. B62D 25/04
296/203.03

(Continued)

FOREIGN PATENT DOCUMENTS

CN   1678477 A   10/2005
DE   10 2005 017 980 A1   11/2006
(Continued)

OTHER PUBLICATIONS

Jun. 21, 2022 extended Search Report issued in European Patent Application No. 19930293.6.
(Continued)

*Primary Examiner* — Amy R Weisberg
*Assistant Examiner* — Wenwei Zhuo
(74) *Attorney, Agent, or Firm* — Oliff PLC

(57) ABSTRACT

An automotive crashworthiness energy absorption part provided at a front part or a rear part of an automotive body and absorbing crashworthiness energy by undergoing axial crush when receiving input of a crashworthiness load from a front or a rear of the automotive body includes: a tubular member configured to absorb crashworthiness energy by undergoing axial crush, the tubular member including a top portion and side wall portions continuous with the top portion; and resin
(Continued)

coated or patched on first outer surfaces including at least outer surfaces of the top portion and the side wall portions of the tubular member. The coated or patched resin has a thickness of 8 mm or less after being heated, forms at least part of a peripheral wall portion of a closed cross section space, and is bonded to the first outer surfaces with an adhesive strength of 10 MPa or more.

5 Claims, 9 Drawing Sheets

(51) Int. Cl.
    *B62D 25/08*     (2006.01)
    *B62D 29/00*     (2006.01)
(58) Field of Classification Search
    CPC .... B60R 2019/1873; B60R 2019/1806; B62D 21/152; B62D 29/005; B62D 29/001; B62D 29/002; B62D 25/08
    USPC ........ 293/120, 122, 133; 296/187.09, 203.02
    See application file for complete search history.

(56) References Cited

U.S. PATENT DOCUMENTS

| | | | | |
|---|---|---|---|---|
| 7,318,873 | B2* | 1/2008 | Czaplicki | B29C 70/70 296/187.02 |
| 11,279,408 | B2* | 3/2022 | Hirose | B62D 25/02 |
| 2002/0033618 | A1* | 3/2002 | Kwon | B62D 29/001 296/187.02 |
| 2006/0145490 | A1 | 7/2006 | Yamaguchi et al. | |
| 2006/0165969 | A1* | 7/2006 | Yamazaki | B62D 29/002 428/313.3 |
| 2010/0028651 | A1* | 2/2010 | Golden | C08L 63/00 428/317.5 |
| 2010/0092733 | A1* | 4/2010 | Blank | B29C 66/742 156/60 |
| 2017/0036701 | A1 | 2/2017 | Yamada et al. | |
| 2018/0257586 | A1* | 9/2018 | Kitakata | B60J 5/0447 |
| 2019/0144041 | A1* | 5/2019 | Belpaire | B62D 29/008 296/209 |
| 2021/0276630 | A1* | 9/2021 | Aitoh | B62D 25/08 |

FOREIGN PATENT DOCUMENTS

| | | | |
|---|---|---|---|
| DE | 102005017980 A1 * | 11/2006 | ........ B62D 21/157 |
| DE | 10 2013 218 743 A1 | 6/2014 | |
| DE | 102013020437 A1 * | 1/2015 | ........ B60J 5/0443 |
| JP | 62128732 A * | 6/1987 | ........ B29C 65/02 |
| JP | 2000-318075 A | 11/2000 | |
| JP | 2001-048054 A | 2/2001 | |
| JP | 2001-088740 A | 4/2001 | |
| JP | 2002173049 A * | 6/2002 | |
| JP | 2003-226261 A | 8/2003 | |
| JP | 2005-271875 A | 10/2005 | |
| JP | 2006-240134 A | 9/2006 | |
| JP | 2016-180445 A | 10/2016 | |
| JP | 2017-030678 A | 2/2017 | |
| JP | 2017-053365 A | 3/2017 | |
| JP | 2017-061068 A | 3/2017 | |
| JP | 2018-144529 A | 9/2018 | |
| KR | 10-2007-0111812 A | 11/2007 | |

OTHER PUBLICATIONS

Apr. 13, 2023 Office Action issued in Korean Patent Application No. 10-2021-7038294.
Jan. 19, 2023 Office Action issued in Chinese Patent Application No. 201980096683.6.
Hasegawa et al., "Cold-Rolled and Galvannealed (GA) High Strength Steel Sheets for Automotive Cabin Structure," JFE Technical Report, Aug. 2012, No. 30, pp. 6-12.
Mar. 10, 2020 International Search Report issued in International Patent Application No. PCT/JP2019/051364.

* cited by examiner (a)            (b)

AUTOMOTIVE CRASHWORTHINESS ENERGY ABSORPTION PART AND METHOD FOR MANUFACTURING THE SAME

FIELD

The present invention relates to automotive crashworthiness energy absorption parts and a method for manufacturing the same and, in particular, to automotive crashworthiness energy absorption parts configured to absorb crashworthiness energy by undergoing axial crush when a crashworthiness load is input from the front or the rear of an automotive body and a method for manufacturing the same.

BACKGROUND

As techniques improving automotive crashworthiness energy absorptive properties, there are many techniques including optimization of the shape, the structure, the material, and the like of automotive parts. In addition, in recent years many techniques have been developed filling the inside of automotive parts having a closed cross sectional structure with resin (such as foamed resin) while being foamed to achieve both improvement in the crashworthiness energy absorptive properties of the automotive parts and weight reduction of automotive body.

Patent Literature 1, in automotive structural members having a structure in which a top portion direction of parts with a hat-shaped cross section, such as a side sill, a floor member, and a pillar, is aligned and flanges are overlapped with each other to form a closed space thereinside, discloses a technique filling the inside with a foamed filler to improve the bending strength and the torsional stiffness of the automotive structural members while reducing a weight increase and to improve the rigidity and the collision safety of automotive bodies, for example.

Patent Literature 2 discloses a technique, when the inside space of a closed cross sectional structure such as a pillar in which parts with a hat-shaped cross section face each other to bring flange portions thereof into contact with each other is filled with a high-rigidity foaming body, the high-rigidity foaming body is fixed by compressive counterforce by filling the inside space with the high-rigidity foaming body and foaming of the high-rigidity foaming body to improve strength, rigidity, and crashworthiness energy absorptive property as well as to improve vibration isolating performance to inhibit transmission of vibration sounds.

Patent Literature 3 discloses a metal-carbon fiber-reinforced plastic (CFRP) composite material in which a reinforcement formed of CFRP with a plurality of fiber layers laminated is bonded to surface of metal parts with a thermosetting adhesive, the composite material having a structure including a residual shear stress relaxing part with a thickness gradually reducing from a main body of the reinforcement toward an edge in order to relax the residual shear stress occurring in the thermosetting adhesive by the difference in a linear expansion coefficient between the metal part and the reinforcement after bonding.

Furthermore, Patent Literature 4 discloses automotive parts, which is a front side member including an energy absorption part formed of fiber-reinforced plastic (FRP) having a tubular cross section causing successive crush from an input end side by an input load in an axial direction and a support part continuous therewith and formed of FRP to be joined to an automotive body part, the front side member capable of being integrally molded including the energy absorption part in which reinforcing fibers are equally oriented in the longitudinal direction of the front side member and a direction orthogonal thereto and the support part in which reinforcing fibers are oriented with isotropy.

CITATION LIST

Patent Literature

Patent Literature 1: Japanese Patent Application Laid-open No. 2006-240134
Patent Literature 2: Japanese Patent Application Laid-open No. 2000-318075
Patent Literature 3: Japanese Patent Application Laid-open No. 2017-61068
Patent Literature 4: Japanese Patent Application Laid-open No. 2005-271875

SUMMARY

Technical Problem

According to the techniques disclosed in Patent Literature 1 and Patent Literature 2, it is stated that the inside of the automotive part is filled with a foamed filler or a foaming body, whereby the strength and the crashworthiness energy absorptive property against bending deformation of the automotive part and further the rigidity thereof against torsional deformation can be improved, and the deformation of the automotive part can be reduced.

However, for automotive parts, such as a front side member and a crash box configured to absorb crashworthiness energy by undergoing bellows-shaped buckling deformation when receiving input of a crashworthiness load from the front or the rear of a car to undergo axial crush, even when the technique filling the inside of the automotive parts with the foamed filler or the foaming body is applied, the inside of the automotive part is only filled therewith, and adhesive strength between the automotive parts and the foamed filler or the foaming body is insufficient. Consequently, there is a problem in that the foamed filler or the foaming body inside the part blows out through a gap of a joint of the part or the like at the time of a crash, making it difficult to improve the crashworthiness energy absorptive property.

According to the techniques disclosed in Patent Literature 3 and Patent Literature 4, it is stated that CFRP is bonded to the surface of metal, whereby bending strength can be improved; the part is integrally manufactured considering the orientation of CFRP itself, whereby a reduction in a part assembly man-hour and a reduction in a weight increase owing to a reduction in the number of fastening parts can be achieved.

However, even when CFRP is applied for axial crush parts involving deformation, CFRP has high strength, but has extremely low elongation, and thus there is a problem in that although only load resistance at the earliest stage of a crash improves, the moment bellows-shaped deformation starts, destruction such as fold or fracture of CFRP occurs, which does not improve the crashworthiness energy absorptive property.

The present invention has been made in order to solve the above problems, and an object thereof is to provide an automotive crashworthiness energy absorption part, such as a front side member or a crash box, that improves, by an outer surface coated with resin, the effect of absorbing crashworthiness energy by undergoing axial crush when receiving input of a crashworthiness load from the front or the rear of an automotive body, and is capable of functioning as a damping material that absorbs vibrations occurring in the automotive body and a method for manufacturing the same.

Solution to Problem

An automotive crashworthiness energy absorption part according to the present invention is provided at a front part or a rear part of an automotive body, absorbs crashworthiness energy by undergoing axial crush when receiving input of a crashworthiness load from a front or a rear of the automotive body, and includes: a tubular member configured to absorb crashworthiness energy by undergoing axial crush, the tubular member including a top portion and side wall portions continuous with the top portion; and resin coated or patched on at least outer surfaces of the top portion and the side wall portions of the tubular member, wherein the coated or patched resin has a thickness of 8 mm or less after being heated, forms at least part of a peripheral wall portion of a closed cross section space, and is bonded to the outer surfaces with an adhesive strength of 10 MPa or more.

The automotive crashworthiness energy absorption part may includes a separation prevention member that covers a surface of the resin and is joined to outer surfaces of the side wall portions in order to prevent the resin from separating from the outer surfaces, wherein the resin is also bonded to the separation prevention member with an adhesive strength of 10 MPa or more.

A manufacturing method of an automotive crashworthiness energy absorption part according to the present invention for manufacturing an automotive crashworthiness energy absorption part including a tubular member provided at a front part or a rear part of an automotive body and configured to absorb crashworthiness energy by undergoing axial crush when receiving input of a crashworthiness load from a front or a rear of the automotive body, the tubular member including a top portion and side wall portions continuous with the top portion includes: a step of coating or patching an outer surface of the tubular member with resin having a thickness of 8 mm or less; and a step of performing heat treatment on the tubular member coated or patched with the resin on certain conditions to bond the resin to the outer surface of the tubular member with an adhesive strength of 10 MPa or more.

A manufacturing method of an automotive crashworthiness energy absorption part according to the present invention manufactures the automotive crashworthiness energy absorption part according to the present invention and includes: a step of coating or patching the outer surfaces of the tubular member with resin having a thickness of 8 mm or less; a step of proving the separation prevention member preventing the resin coated or patched on the outer surfaces from separating from the outer surfaces so as to cover a surface of the resin to join the separation prevention member to the outer surfaces of the side wall portions; and a step of performing heat treatment on the tubular member coated or patched with the resin on certain conditions to bond the resin to each of the outer surfaces of the tubular member and the separation prevention member with an adhesive strength of 10 MPa or more.

A manufacturing method of an automotive crashworthiness energy absorption part according to the present invention manufactures the automotive crashworthiness energy absorption part according to the present invention and includes: a step of coating or patching the resin having a thickness of 8 mm or less on the separation prevention member preventing the resin from separating from the outer surfaces of the top portion and the side wall portions continuous with the top portion of the tubular member; a step of bringing the resin of the separation prevention member coated or patched with the resin into contact with the outer surfaces of the tubular member and joining the separation prevention member to the outer surfaces of the side wall portions; and a step of performing heat treatment on the tubular member in which the separation prevention member is joined to the outer surfaces on certain conditions to bond the resin to each of the outer surface and the separation prevention member with an adhesive strength of 10 MPa or more.

Advantageous Effects of Invention

According to the present invention, in a process in which a tubular member configured to absorb crashworthiness energy by undergoing axial crush when receiving input of a crashworthiness load from the front or the rear of an automotive body undergoes compressive deformation, the buckling strength of the tubular member can be improved, bellows-shaped buckling deformation can be caused without reducing the deformation resistance of the tubular member, fracture in a bending portion in the buckling deformation of the tubular member can be prevented, and crashworthiness energy absorptive property can be improved. Furthermore, according to the present invention, vibration-damping properties can be improved by absorbing vibrations from an automotive engine and vibrations input to the automotive body from various directions while driving a car.

DESCRIPTION OF EMBODIMENTS

The following describes an automotive crashworthiness energy absorption part and a method for manufacturing the same according to first and second embodiments of the present invention based on FIG. 1 to FIG. 8. In the present specification and drawings, components having substantially the same function and configuration are denoted by the same symbols, whereby a duplicate description is omitted.

First Embodiment

<Automotive Crashworthiness Energy Absorption Part>

Figure 1:
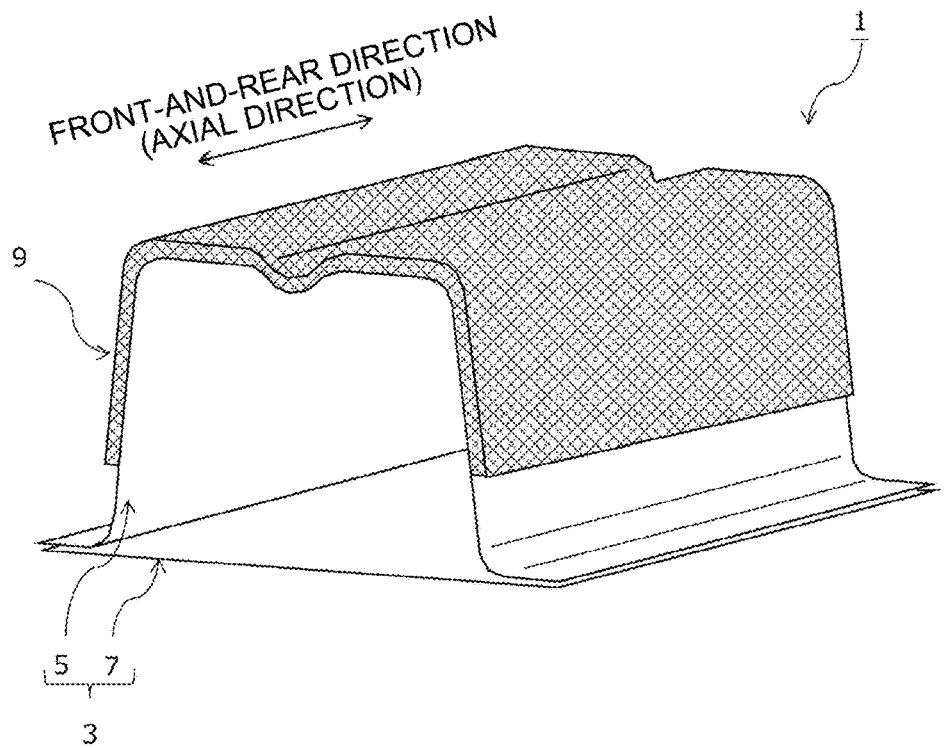
FIG. 1 is a perspective view of an automotive crashworthiness energy absorption part according to a first embodiment of the present invention.
Figure 2:
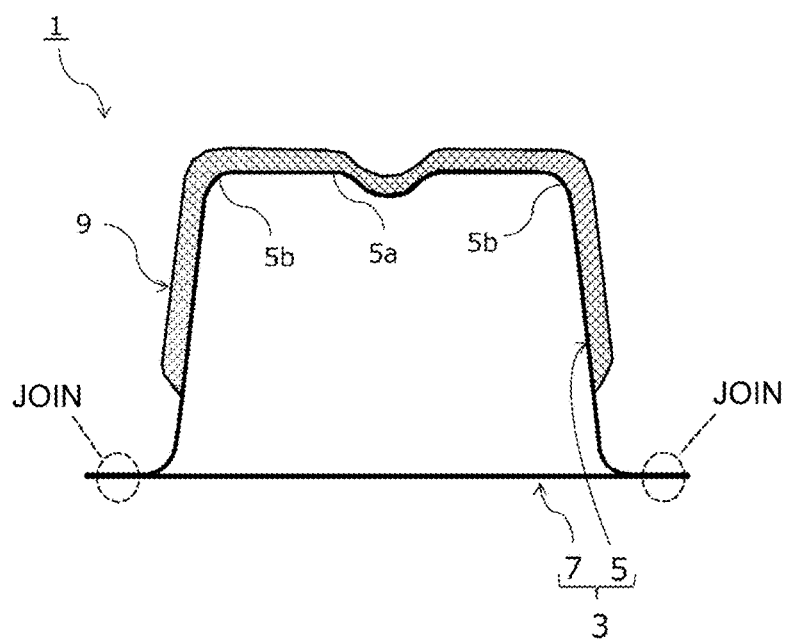
FIG. 2 is a sectional view of the automotive crashworthiness energy absorption part according to the first embodiment of the present invention.

As exemplified in FIG. 1 and FIG. 2, an automotive crashworthiness energy absorption part 1 according to the first embodiment of the present invention is provided at a front part or a rear part of an automotive body and configured to absorb crashworthiness energy by undergoing axial crush in a longitudinal direction of a tubular member 3 when receiving input of a crashworthiness load from the front or the rear of the automotive body, and includes the tubular member 3 formed in a tubular shape with an outer part 5 and an inner part 7 joined together and resin 9 coated on an outer surface of the tubular member 3.

The tubular member 3 absorbs crashworthiness energy by undergoing axial crush, has a top portion and side wall portions continuous with the top portion, and is formed in a tubular shape with the outer part 5 with a hat-shaped cross section formed of a metal sheet and the flat plate-shaped inner part 7 formed of a metal sheet joined together to have a closed cross section space thereinside as illustrated in FIG. 1, for example. Here, the closed cross section space refers to a space in which a cross sectional shape of a peripheral wall portion of the tubular member 3 in a direction crossing an axial direction of the tubular member 3 is a closed cross section and, in the tubular member 3 illustrated in FIG. 1, formed by closed cross sections continuous along the axial direction. Such a closed cross section space is formed by joining the outer part 5 with a hat-shaped cross section and the flat plate-shaped inner part 7 together; spot welding can be used for joining of the outer part 5 and the inner part 7, for example.

The tubular member 3 having such a closed cross section space can be used for automotive parts having a closed cross sectional structure such as a front side member extending in a front-and-rear direction of an automotive body at right and left positions at the front part of the automotive body to form part of an automotive body frame and a crash box provided at a front end or a rear end of the automotive body frame; the automotive parts are installed in the automotive body such that the axial direction (the longitudinal direction) of the tubular member 3 matches the front-and-rear direction of the automotive body.

Examples of the type of the metal sheet for use in the tubular member 3 used as automotive parts include cold rolled steel sheets, hot rolled steel sheets, stainless steel sheets, zinc-based coating steel sheets, zinc alloy coating steel sheet, aluminum alloy coating steel sheets, and aluminum alloy sheets.

As illustrated in FIG. 1 and FIG. 2, the resin 9 is a coating with a thickness of 8 mm or less on an outer surface of the outer part 5 forming the tubular member 3. The resin 9 is bonded to the outer part 5 with an adhesive strength of 10 MPa or more.

Examples of the type of the resin 9 of the automotive crashworthiness energy absorption part 1 according to the first embodiment include thermoplastic resins, thermoset resins, and elastomer resins. Examples of the thermoplastic resins include vinyl resins (vinyl acetate, vinyl chloride, and the like), acrylic resins, polyamide resins, polystyrene resins, and cyanoacrylate resins. Examples of the thermoset resins include epoxy resins, urethane resins, ester resins, phenolic resins, melamine resins, and urea resins. Examples of the elastomer resins include nitrile rubber resins, styrene butadiene rubber resins, modified silicone resins, butyl rubber resins, urethane rubber resins, and acrylic rubber resins.

From the viewpoint of reducing the weight of the automotive crashworthiness energy absorption part 1, the resin 9 is preferably foamed resin. When the foamed resin is used as the resin 9, its foaming ratio is not limited to a particular ratio.

The adhesive strength between the resin 9 and the tubular member 3 can be maximum sheared stress or average sheared stress acting on an interface between the metal sheet and the resin; the maximum sheared stress or the average sheared stress can be obtained by crashworthiness analysis of a doubled-layered square column in which the metal sheet (a steel sheet or the like) and the resin are bonded together, for example.

The adhesive strength between the resin 9 and the tubular member 3 may be obtained by cutting out part of the resin 9 and the tubular member 3 after bonding, installing the resin 9 and the tubular member 3 that have been cut out in a tensile testing machine, and pulling them with one holding the resin 9 and the other holding the tubular member 3. Alternatively, the adhesive strength between the resin 9 and the tubular member 3 may be one measured by a method cutting out part of the tubular member 3 and the resin 9 after bonding, installing them in the tensile testing machine, and pulling them with one holding the resin 9 and the other holding a grip portion (not illustrated) formed by bending the tubular member 3 formed of a metal sheet or joining a grip part to the tubular member 3 and gripping and pulling the grip part by the tensile testing machine.

As described above, the automotive crashworthiness energy absorption part 1 according to the first embodiment has the tubular member 3 the outer surface of which is coated with the resin 9 with a thickness of 8 mm or less, however, in the present invention, a plate-shaped resin with a thickness of 8 mm or less may be patched on the outer surface of the tubular member using an adhesive. Furthermore, a film-shaped resin with a thickness of about 100 μm may be patched on the outer surface of the tubular member as in a laminate of a laminated steel sheet. The adhesive strength between the plate-shaped resin or the film-shaped resin and the outer surface of the tubular member is required to be 10 MPa or more.

<Manufacturing Method of Automotive Crashworthiness Energy Absorption Part>

The following describes a manufacturing method of an automotive crashworthiness energy absorption part according to the first embodiment. The manufacturing method of an automotive crashworthiness energy absorption part according to the first embodiment is a method for manufacturing the automotive crashworthiness energy absorption part 1 that includes the tubular member 3 provided at a front part or a rear part of an automotive body and configured to absorb crashworthiness energy when receiving input of a crashworthiness load from the front or the rear of the automotive body as exemplified in FIG. 1 and FIG. 2, and the method includes a step of coating the outer surface of the tubular member 3 with the resin 9 and a step of performing heat treatment on the tubular member 3 coated with the resin 9 to improve adhesive strength.

In the step of coating the outer surface of the tubular member 3 with the resin 9, either of the following may be employed: the outer part 5 with a hat-shaped cross section formed of a metal sheet and the flat plate-shaped inner part 7 formed of a metal sheet are joined together to form the tubular member 3, and the outer surface of the tubular member 3 is coated with the resin 9 with a thickness of 8 mm or less; or parts corresponding to the outer surface of the tubular member 3 in the outer part 5 and the inner part 7 is coated with the resin with a thickness of 8 mm or less, and then the outer part 5 and the inner part 7 are joined together to form the tubular member 3.

Examples of a specific method for coating with the resin 9 include a method in which the outer surface of the tubular member is coated with the resin 9 sprayed using a spray nozzle, a method in which the outer surface of the tubular member 3 is coated with the resin 9 using a brush or the like, and a method in which the outer surface of the tubular member 3 is coated with the resin 9 by immersing the tubular member 3 into a tank in which paint containing the resin 9 is stored. Considering a weight increase by the resin, only a part of the peripheral wall portion of the tubular member 3 was coated with the resin.

In the step of performing heat treatment, heat treatment is performed on the tubular member 3 coated with the resin 9 on certain conditions to bond the resin 9 to the outer surface of the tubular member 3 with an adhesive strength of 10 MPa or more. In this step, the resin 9 and the tubular member 3 can be bonded to each other through adhesive capacity by heating, melting, and solidifying of the resin 9 itself or with an adhesive.

In the case of bonding through the adhesive capacity of the resin 9 itself, the heat treatment may be performed after the outer surface of the tubular member 3 is coated with the resin 9, and the temperature and time of the heat treatment may be adjusted as appropriate so as to give an adhesive strength of 10 MPa or more in accordance with the type of the resin 9 coated on the outer surface. On the other hand, in the case of bonding using the adhesive, the heat treatment may be performed after the resin 9 and the outer surface of the tubular member 3 have been bonded to each other via the adhesive, and the temperature and time of the heat treatment may be adjusted as appropriate so as to make the adhesive strength of the adhesive 10 MPa or more. The step of performing heat treatment in the present invention may also serve as a step of applying paint to the outer surface of the tubular member 3 and performing baking finish, for example.

The adhesive strength between the resin 9 and the outer surface of the tubular member 3 can be obtained by a crashworthiness analysis of the doubled-layered square column in which the metal sheet (a steel sheet or the like) and the resin are bonded together or obtained by the measurement using the tensile testing machine as described above.

The manufacturing method of an automotive crashworthiness energy absorption part according to the first embodiment is a method in which the outer surface of the tubular member 3 is coated with the resin 9 as described above, however, in the present invention, a plate-shaped resin with a thickness of 8 mm or less may be patched on the outer surface of the tubular member using the adhesive. Furthermore, a film-shaped resin with a thickness of about 100 μm may be patched on the outer surface of the tubular member like a laminate of a laminated steel sheet. In the step of performing heat treatment, the adhesive strength between the plate-shaped resin or the film-shaped resin and the outer surface of the tubular member may be made 10 MPa or more.

The following describes the reason why the crashworthiness energy absorptive property improves in the process in which the automotive crashworthiness energy absorption part 1 according to the first embodiment undergoes axial crush.

In a conventional automotive crashworthiness energy absorption part having a tubular member formed of a metal sheet such as a steel sheet, in a process in which a crashworthiness load is input to an axial tip of the automotive crashworthiness energy absorption part, and the tubular member undergoes axial crush beyond its buckling strength, the automotive crashworthiness energy absorption part absorbs crashworthiness energy by repeatedly causing bellows-shaped buckling deformation on the tubular member.

In this process, if the tubular member undergoes buckling deformation without fracture, the crashworthiness energy is most likely to be absorbed; when fracture occurs at the tip of a bellows-shaped bending portion after the tubular member has undergone bellows-shaped buckling deformation, absorption of the crashworthiness energy is insufficient, and intrinsic performance cannot be exhibited. This bellows-shaped bending portion along with the buckling deformation of the tubular member has a small bending radius unique to the metal sheet, and thus stress concentrates on a bending surface, in which fracture is likely to occur.

In the shape of the tubular member, parts having high performance to absorb the crashworthiness energy are the portions connecting the top portion and the side wall portions to each other, which are also parts that are most likely to be subjected to work and undergo work hardening when the tubular member is press formed. Consequently, owing to a reduction in elongation by work hardening, fracture is likely to occur at the tip of the bellows-shaped bending portion connecting the top portion and the side wall portions to each other.

Figure 3:
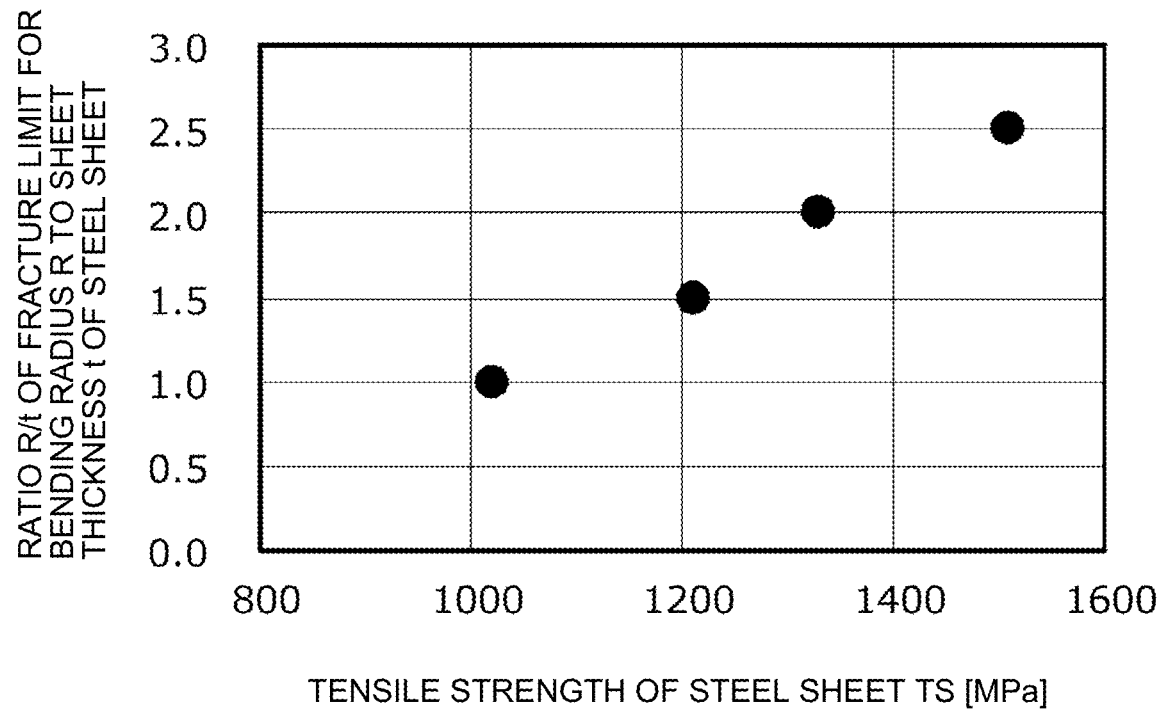
FIG. 3 is a graph of a relation between a tensile strength level of steel sheets and the ratio of a fracture limit for bending radius to a sheet thickness of the steel sheets.

In particular, high-strength steel sheets that have been employed for automotive parts for the purpose of achieving both crashworthiness performance and weight reduction of automotive body in recent years have lower elongation than that of steel sheets with conventional strength; thus, according to a relation between a steel sheet tensile strength level and fracture limit for bending radius R/sheet thickness t of the steel sheet illustrated in Table 1 and FIG. 3 (refer to Reference 1 below), for the same sheet thickness, a larger steel sheet tensile strength TS is more likely to cause fracture with a larger bending radius. Thus, when an automotive crashworthiness energy absorption part including a high-strength steel sheet undergoes bellows-like buckling deformation, fracture becomes more likely to occur at the tip of the bellows-shaped bending portion along with an increase in the steel sheet strength.

(Reference 1) Kohei Hasegawa, Shinjiro Kaneko, and Kazuhiro Seto, "Cold-Rolled and Galvannealed (GA) High Strength Steel Sheets for Automotive Cabin Structure", JFE Technical Report, No. 30 (August, 2012), pp. 6-12

TABLE 1

| Steel sheet strength level | TS [MPa] | R/t [—] |
|---|---|---|
| 780 MPa class | 810 | Less than 1.0 |
| 980 MPa class | 1020 | 1.0 |
| 1180 MPa class | 1210 | 1.5 |
| 1320 MPa class | 1330 | 2.0 |
| 1470 MPa class | 1510 | 2.5 |

Consequently, for applying the high-strength steel sheets for automotive crashworthiness energy absorption parts, the above has been a factor to hinder the progress of further improvement in the strength of the steel sheets. Given these circumstances, in the present invention, attention has been paid to the fact that the bellows-shaped bending portion of the tubular member has the small bending radius unique to the metal sheet described above, and it has thus been thought that if the bending radius can be increased, fracture at the tip of the bellows-shaped bending portion along with the buckling deformation at the time of a crash can be prevented.

That is to say, when the tubular member 3 formed of a metal sheet undergoes buckling deformation at an early axial crush crash stage, in a bending portion that has become deformed in a convex shape, an object to be interposed between the metal sheet and the metal sheet is held therebetween and is compressed, and thereby the bending radius of the convex bending portion can be kept large. However, adding the object interposed between the metal sheet and the metal sheet leads to a weight increase of the part, and thus its weight is preferably as light as possible.

Given these circumstances, in the present invention, the resin is bonded to the outer surface of the tubular member, and the resin is held between the metal sheet and the metal sheet, whereby the resin is interposed therebetween, and the bending radius of the convex bending portion can be made larger than the fracture limit for bending radius unique to the metal sheet, and fracture is prevented from occurring in the bellows-shaped bending portion of the tubular member. Consequently, the crashworthiness energy absorptive property can be inhibited from reducing.

However, when the adhesive strength between the resin coated on the outer surface of the tubular member of the automotive crashworthiness energy absorption part and the outer surface of the tubular member is low, in a process immediately after input of the crashworthiness load to the axial tip of the automotive crashworthiness energy absorption part and the start of buckling deformation to the termination of axial crush deformation, the resin coated on the outer surface of the tubular member peels off and separates from the tubular member. Consequently, fracture occurs in the tubular member formed of a metal sheet in the buckling deformation, and the crashworthiness energy absorptive property cannot be improved.

On the other hand, in the automotive crashworthiness energy absorption part 1 according to the first embodiment, the resin 9 coated on the outer surface of the tubular member 3 and bonded thereto with an adhesive strength of 10 MPa or more does not peel off and separate from the outer surface of the tubular member 3 in the process of axial crush and undergoes compressive deformation together with the tubular member 3.

Thus, the buckling strength of the tubular member 3 can be improved, and the bellows-shaped buckling deformation can be caused repeatedly in the tubular member 3 without reducing the deformation resistance of the tubular member 3, and consequently, the crashworthiness energy absorptive property can be improved.

Furthermore, the thickness of the resin 9 after being coated and heated is made 8 mm or less, whereby when the tubular member 3 made of a metal sheet undergoes buckling deformation at the early axial crush crash stage, in a bending portion that has become deformed in a concave shape, the resin is held between the metal sheet and the metal sheet. Thus, the bending radius of the concave bending portion can be prevented from becoming smaller than the fracture limit for bending radius unique to the metal sheet, and fracture is prevented from occurring in the metal sheet. Consequently, the crashworthiness energy absorptive property can be inhibited from reducing.

There is no need to cover the entire closed cross section space of the tubular member 3 with the resin like conventional ones. This is because owing to the above reason, the resin is only required to be present at the tip of the bellows-shaped bending portion along with buckling deformation at the time of a crash. Consequently, in order for the resin to present along with buckling deformation, the resin is essentially bonded to the parts connecting the top portion and the side wall portions of the tubular member 3 to each other, which are parts having high performance to absorb crashworthiness energy.

Figure 4:
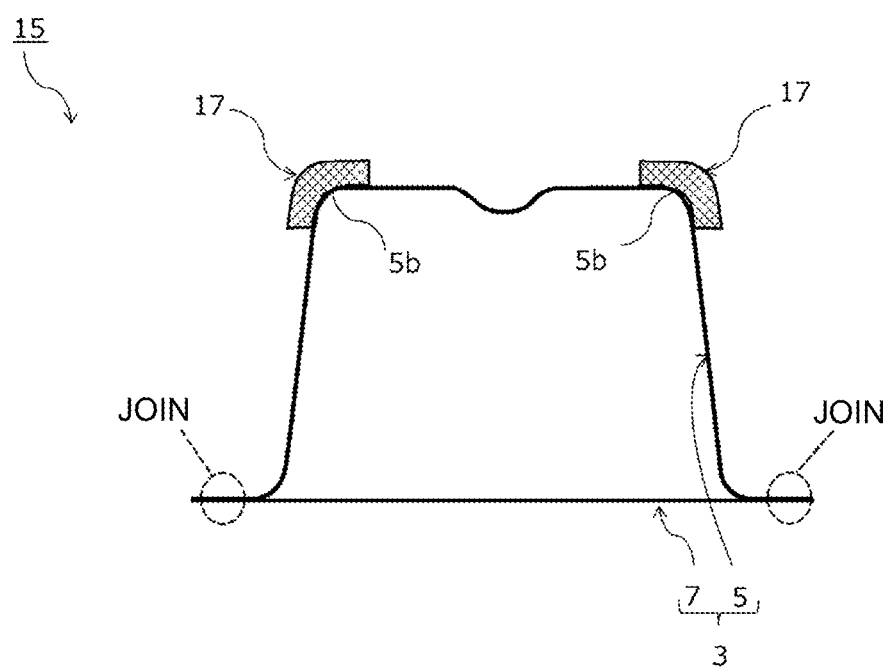
FIG. 4 is a sectional view of another aspect of the automotive crashworthiness energy absorption part according to the first embodiment of the present invention (No. 1).

Thus, as in an automotive crashworthiness energy absorption part 15 illustrated in FIG. 4, even a component in which punch shoulder R portions 5b of the outer part 5 are coated with resin 17 can inhibit the crashworthiness energy absorptive property when the crashworthiness load is input in the axial direction from reducing and can improve buckling strength.

Figure 5:
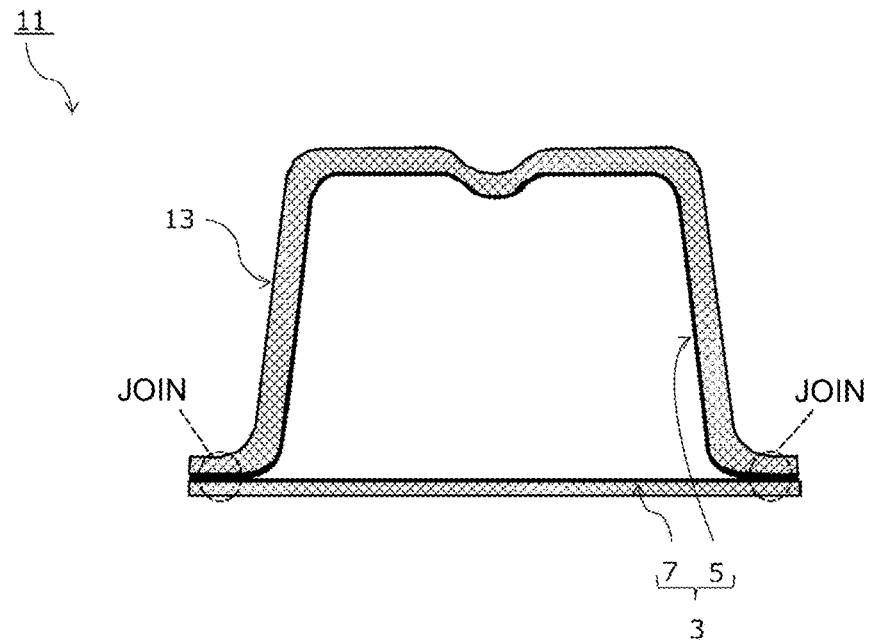
FIG. 5 is a sectional view of another aspect of the automotive crashworthiness energy absorption part according to the first embodiment of the present invention (No. 2).

However, as illustrated in FIG. 5, even an automotive crashworthiness energy absorption part 11 in which the entire outer surface of the tubular member 3 is coated with resin 13 to form the entire peripheral wall portion of the closed cross section space can produce the effects of improving the buckling strength of the tubular member 3 and preventing fracture therein.

Furthermore, in the automotive crashworthiness energy absorption part 1 according to the first embodiment, the resin 9 coated on the outer surface of the tubular member 3 functions also as a damping material that absorbs vibrations. When the automotive crashworthiness energy absorption part 1 is used as a front side member as a part configured to absorb crashworthiness energy by undergoing axial crush, for example, the resin 9 can absorb the vibrations of an automotive engine installed on the front side member, thus improving vibration-damping properties. This point will be demonstrated by examples, which will be described below.

In the above description, the tubular member 3 is formed by joining the outer part 5 with a hat-shaped cross section and the flat plate-shaped inner part 7 together by spot welding or the like. However, the tubular member 3 is not limited to this example and may be formed in a tubular shape by joining members with a hat-shaped cross section or a U-shaped cross section together, be a cylindrical member or a cylindrical member with its cross section formed in a polygon, or be a polygon with a plurality members brought together via flange surfaces, for example.

Furthermore, although the above description is for the automotive crashworthiness energy absorption part 1 in which the outer surface of the tubular member 3 is coated with the resin 9, even a component in which a plate-shaped or film-shaped resin is patched on the outer surface of the tubular member with an adhesive strength of 10 MPa or more can produce effects similar to those of the automotive crashworthiness energy absorption part 1 according to the first embodiment.

Second Embodiment

<Automotive Crashworthiness Energy Absorption Part>

In the automotive crashworthiness energy absorption part 1 according to the first embodiment described above, further, to surely ensure an adhesive strength between the outer surface of the tubular member 3 and the resin 9 of 10 MPa or more, a unit preventing separation of the resin 9 was studied so as to eliminate a case in which the resin 9 bonded to the outer surface of the tubular member 3 separates in the process of axial crush and the crashworthiness energy absorptive property is not improved.

Figure 6:
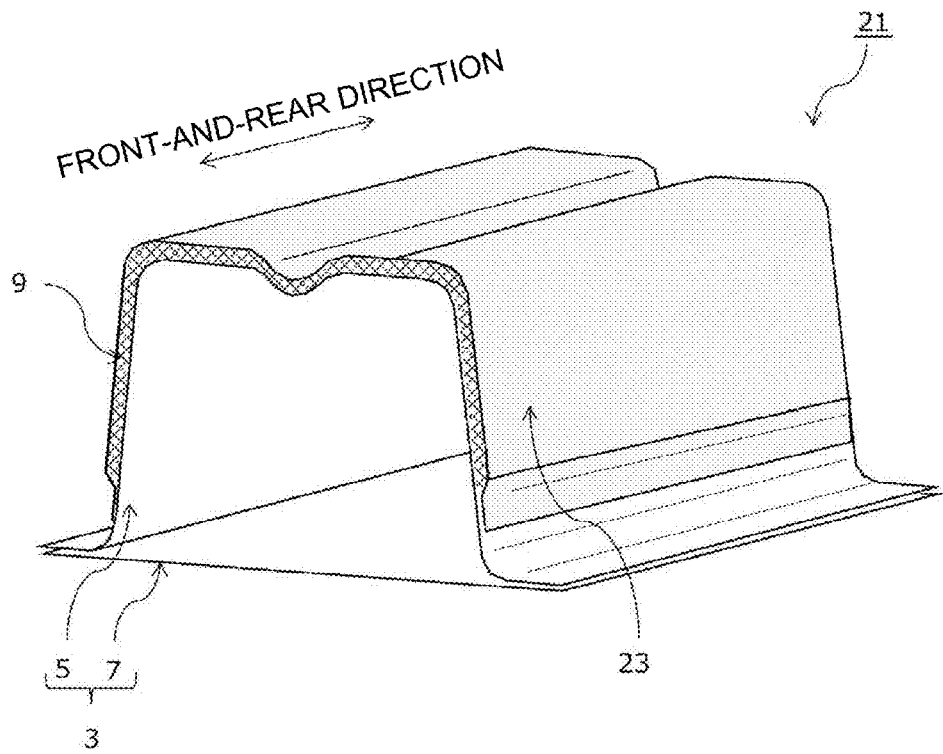
FIG. 6 is a perspective view of an automotive crashworthiness energy absorption part according to a second embodiment of the present invention.
Figure 7:
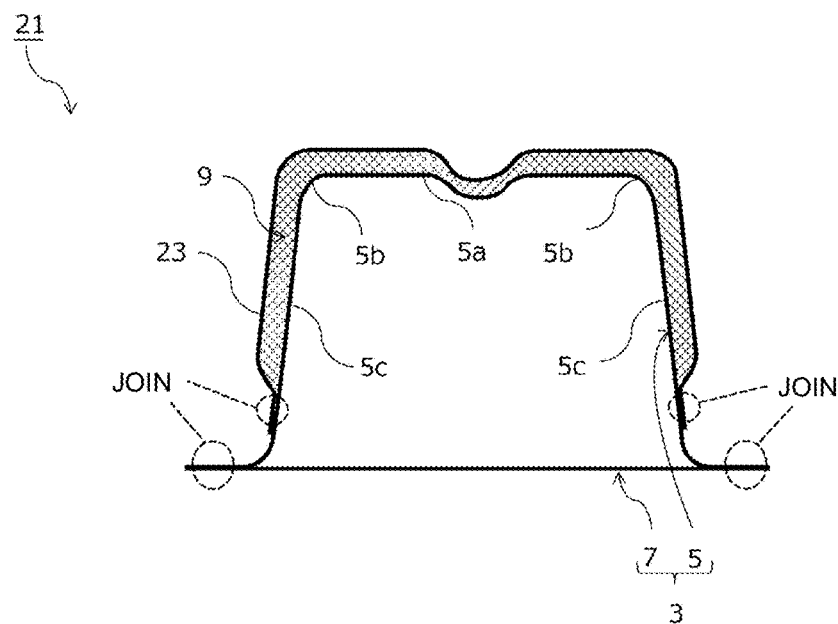
FIG. 7 is a sectional view of the automotive crashworthiness energy absorption part according to the second embodiment of the present invention.
Figure 8:
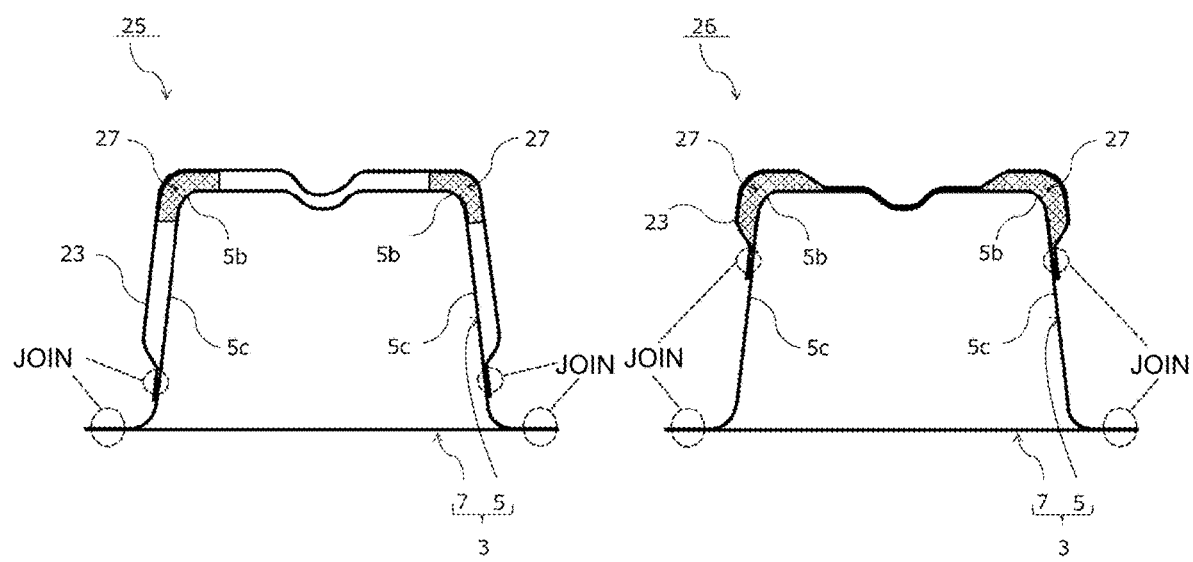
FIG. 8 is a sectional view of another aspect of the automotive crashworthiness energy absorption part according to the second embodiment of the present invention.

Given these circumstances, as illustrated in FIG. 6 and FIG. 7, an automotive crashworthiness energy absorption part 21 according to the second embodiment of the present invention includes the tubular member 3 that is configured to absorb crashworthiness energy by undergoing axial crush and has the top portion and the side wall portions continuous with the top portion, and the resin 9 that is coated on the outer surface of the tubular member 3, in which the resin 9 is coated with a thickness of 8 mm or less on the outer surface and bonded thereto with an adhesive strength of 10 MPa or more, and further includes a separation prevention member 23 that covers the surface of the resin 9 and is joined to outer surfaces of the side wall portions 5c of the tubular member 3 in order to prevent the resin 9 from separating from the outer surface of the tubular member 3, in which the resin 9 is also bonded to the separation prevention member 23 with an adhesive strength of 10 MPa or more.

The separation prevention member 23 is formed of a metal sheet (formed of a steel sheet, for example) and, as illustrated in FIG. 7, the separation prevention member 23 covers the resin 9 coated on the outer part 5 as part of the outer surface of the tubular member 3 and is joined to the outer surfaces of the side wall portions 5c of the outer part 5 by spot welding, for example. The role of the separation prevention member 23 is to prevent separation of the resin 9, and the metal sheet may have low strength and a thin sheet thickness. The resin 9 is required at least for portions (the punch shoulder R portions 5b) connecting the top portion 5a and the side wall portions 5c to each other and is desired to be reduced in weight as much as possible as well, and thus the vertical wall height of the resin 9 is desired to be short, and thus the separation prevention member 23 was joined to the side wall portions 5c of the outer part 5.

The adhesive strength between the resin 9 and the tubular member 3 and the separation prevention member 23 may be obtained by the crashworthiness analysis of a doubled-layered square column in which the metal sheet (a steel sheet or the like) and the resin are bonded together or be obtained by cutting out part of the resin and the tubular member and the separation prevention member after bonding and performing measurement by the tensile testing machine in the same manner as the first embodiment described above.

As described above, the automotive crashworthiness energy absorption part 21 according to the second embodiment is a component in which the outer surface of the tubular member 3 is coated with the resin 9, however, in the present invention, a plate-shaped resin with a thickness of 8 mm or less may be patched on the outer surface of the tubular member using an adhesive. Furthermore, a film-shaped resin with a thickness of about 100 μm may be patched on the outer surface of the tubular member as in a laminate of a laminated steel sheet. The adhesive strength between the plate-shaped resin or the film-shaped resin and the outer surface of the tubular member may be 10 MPa or more.

<Manufacturing Method of Automotive Crashworthiness Energy Absorption Part>

The following describes a manufacturing method of an automotive crashworthiness energy absorption part according to the second embodiment. An aspect of the manufacturing method of an automotive crashworthiness energy absorption part according to the second embodiment is a method for manufacturing the automotive crashworthiness energy absorption part 21 including the tubular member 3 that is provided at a front part or a rear part of an automotive body, is configured to absorb crashworthiness energy when receiving input of a crashworthiness load from the front or the rear of the automotive body, and has the top portion and the side wall portions continuous with the top portion as illustrated in FIG. 6 and FIG. 7. The manufacturing method includes a step of coating the outer surface of the tubular member 3 with the resin 9 having a thickness of 8 mm or less, a step of attaching the separation prevention member 23 to the surface of the resin 9 and joining the separation prevention member 23 to the outer surface of the tubular member 3, and a step of performing heat treatment on the tubular member 3 coated with the resin 9 on certain conditions to bond the resin 9 to each of the outer surface of the tubular member 3 and the separation prevention member 23 with an adhesive strength of 10 MPa or more.

In the step of coating the outer surface of the tubular member 3 with the resin 9, the outer part 5 with a hat-shaped cross section formed of a metal sheet and the flat plate-shaped inner part 7 formed of a metal sheet are joined together to form the tubular member 3, and then the outer surface of the tubular member 3 is coated with the resin 9 with a thickness of 8 mm or less. In this step, either of the following may be employed: the outer surface of the tubular member 3 is coated with the resin 9 in liquid form with 8 mm or less; or the resin 9 in plate form with a thickness of 8 mm or less is bonded to the outer surface of the tubular member 3 using an adhesive.

In the step of joining the separation prevention member 23 to the outer surface of the tubular member 3, the separation prevention member 23 is attached to the resin coated on the outer surface of the tubular member 3 or bonded thereto using an adhesive and is joined to the outer surfaces of the side wall portions 5c of the outer part 5 by spot welding or the like.

In the step of performing heat treatment, heat treatment is performed on the tubular member 3 coated with the resin 9 and provided with the separation prevention member 23 on certain conditions to bond the resin 9 and each of the outer surface of the tubular member 3 and the separation prevention member 23 together with an adhesive strength of 10 MPa or more.

Alternatively, when the resin 9 is bonded to the outer surface of the tubular member 3 using the adhesive, the heat treatment may be performed after the resin 9 has been bonded to the outer surface of the tubular member 3, and the temperature and time of the heat treatment may be adjusted as appropriate so as to make the adhesive strength of the adhesive 10 MPa or more. The step of performing heat treatment in the present invention may also serve as a step of coating the outer surface of the tubular member 3 with paint and performing baking finish, for example.

The adhesive strength between the resin 9 and the outer surface of the tubular member 3 can be obtained by the crashworthiness analysis of a doubled-layered square column in which the metal sheet (a steel sheet or the like) and the resin are bonded together or measurement using a tensile testing machine as described above.

In the above description, the manufacturing method of an automotive crashworthiness energy absorption part according to the second embodiment is a method in which the outer surface of the tubular member 3 is coated with the resin 9 and then the separation prevention member 23 is provided to the outside of the tubular member 3 to be attached to the surface of the resin 9 and is joined to the outer surface of the tubular member 3. However, coating with the resin 9 and providing the separation prevention member 23 are not limited to the above order.

That is to say, another aspect of the method for manufacturing the automotive crashworthiness energy absorption part 21 according to the second embodiment may include a step of coating or patching the resin 9 with a thickness of 8 mm or less on the separation prevention member 23 preventing the resin 9 from separating from the outer surface of the tubular member 3, a step of bringing the resin 9 of the separation prevention member 23 coated or patched with the resin 9 into contact with the outer surface of the tubular member 3 and joining the separation prevention member 23 to the outer surface of the tubular member 3, and a step of performing heat treatment on certain conditions to bond the resin 9 to each of the outer surface of the tubular member 3 and the separation prevention member 23 with an adhesive strength of 10 MPa or more.

The automotive crashworthiness energy absorption part 21 according to the second embodiment prevents the resin 9 from separating from the outer surface of the tubular member 3 in the process in which the tubular member 3 undergoes bellows-shaped buckling deformation to undergo axial crush like the automotive crashworthiness energy absorption part 1 according to the first embodiment described above. Thus, the automotive crashworthiness energy absorption part 21 according to the present embodiment, when the tubular member 3 undergoes buckling deformation, causes the resin 9 to be held on the outside of the portion that has undergone buckling deformation to effectively prevent the bending radius thereof from becoming less than the fracture limit for bending radius, can thus prevent fracture in the tubular member 3 at an early axial crush crash stage, and can thus further improve the crashworthiness energy absorptive property.

The automotive crashworthiness energy absorption part 21 is a component in which the resin 9 is coated across the top portion 5a of the outer part 5 including the punch shoulder R portions 5b, however, in the present invention, the automotive crashworthiness energy absorption part may be a component in which only the punch shoulder R portions 5b of the outer part 5 are coated with resin 27 as in automotive crashworthiness energy absorption parts 25 and 26 illustrated in FIG. 8(a) and FIG. 8(b).

Thus, even a component in which the resins 27 are coated only on the punch shoulder R portions 5b of the outer part 5 and are bonded to the outer part 5 and the separation prevention member 23 with an adhesive strength of 10 MPa or more prevents the resin 27 from separating from the outer part 5 at the early axial crush crash stage to improve buckling strength and can improve the crashworthiness energy absorptive property. Furthermore, when the punch shoulder R portions 5b in which work hardening has progressed in a press molding step of the outer part 5 undergo buckling deformation in an axial crush step, the resin 27 is held inside a bending portion of the buckling deformation to prevent the bending portion from being bent to the fracture limit for bending radius or less, whereby fracture can be prevented from occurring.

Furthermore, in the automotive crashworthiness energy absorption part 21 according to the second embodiment as well, the resin 9 coated on the outer surface of the tubular member 3 functions also as a damping material that absorbs vibrations.

When the automotive crashworthiness energy absorption part 21 is used as a front side member as a part configured to absorb crashworthiness energy by undergoing axial crush, for example, the resin 9 can absorb the vibrations of an automotive engine installed on the front side member, thus improving vibration-damping properties.

Furthermore, although the above description is for the automotive crashworthiness energy absorption part 21 in which the outer surface of the tubular member 3 is coated with the resin 9, even a component in which a plate-shaped or a film-shaped resin is patched on the outer surface of the tubular member with an adhesive strength of 10 MPa or more can produce effects similar to those of the automotive crashworthiness energy absorption part 21 according to the second embodiment.

EXAMPLES

Experiments for confirming the effects of the automotive crashworthiness energy absorption part according to the present invention were conducted, and the following describes their results.

The present examples, with the automotive crashworthiness energy absorption part according to the present invention as test specimens, performed evaluation of crashworthiness energy absorption characteristic by an axial crush test, and evaluation of a vibration-damping characteristic by measuring a frequency response function in an impact vibration test and calculating a character frequency.

Figure 9:
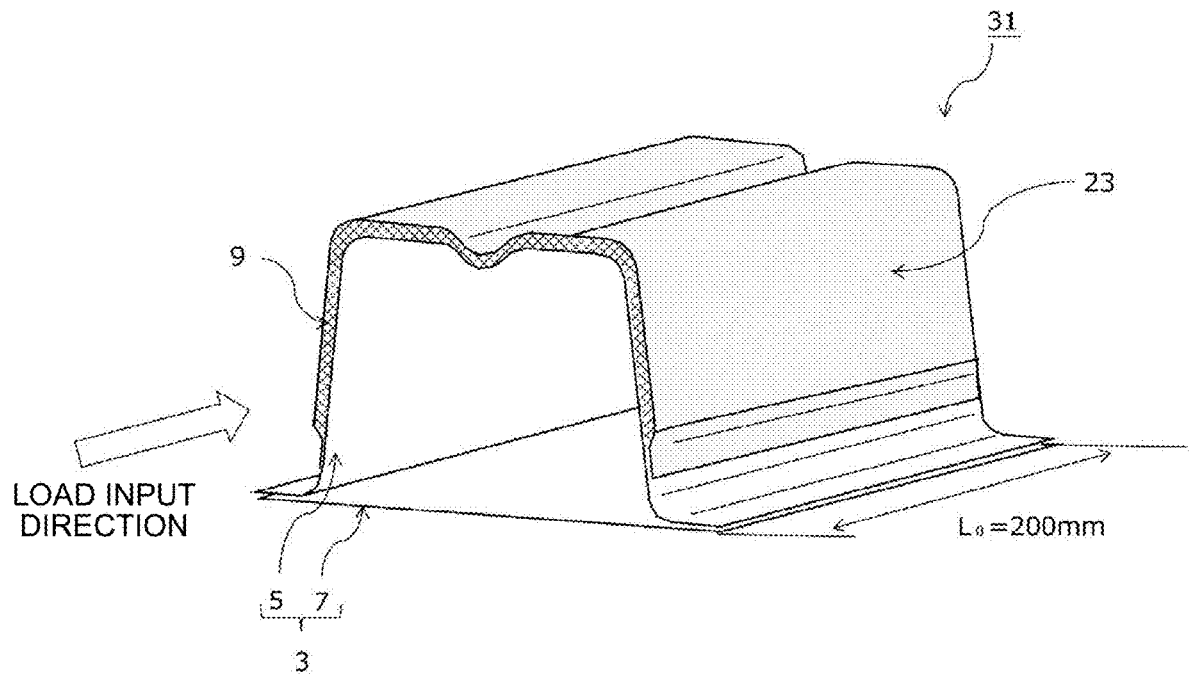
FIG. 9 is a diagram illustrating an axial crush test method in examples.

In the axial crush test, as illustrated in FIG. 9, a load-stroke curve indicating a relation between a load and a stroke (amount of axial crush deformation) when a load is input in an axial direction of a test specimen 31 having the tubular member 3 at a test speed of 17.8 m/s to cause a test specimen length (an axial length $L_0$ of the test specimen 31) to undergo 80 mm-axial crush deformation from 200 mm to 120 mm was measured, and photographing with a high-speed camera was performed to observe the state of deformation and the presence or absence of the occurrence of fracture in the tubular member. Furthermore, absorbed energy in a stroke of 0 to 80 mm was obtained from the measured load-stroke curve.

Figure 10:
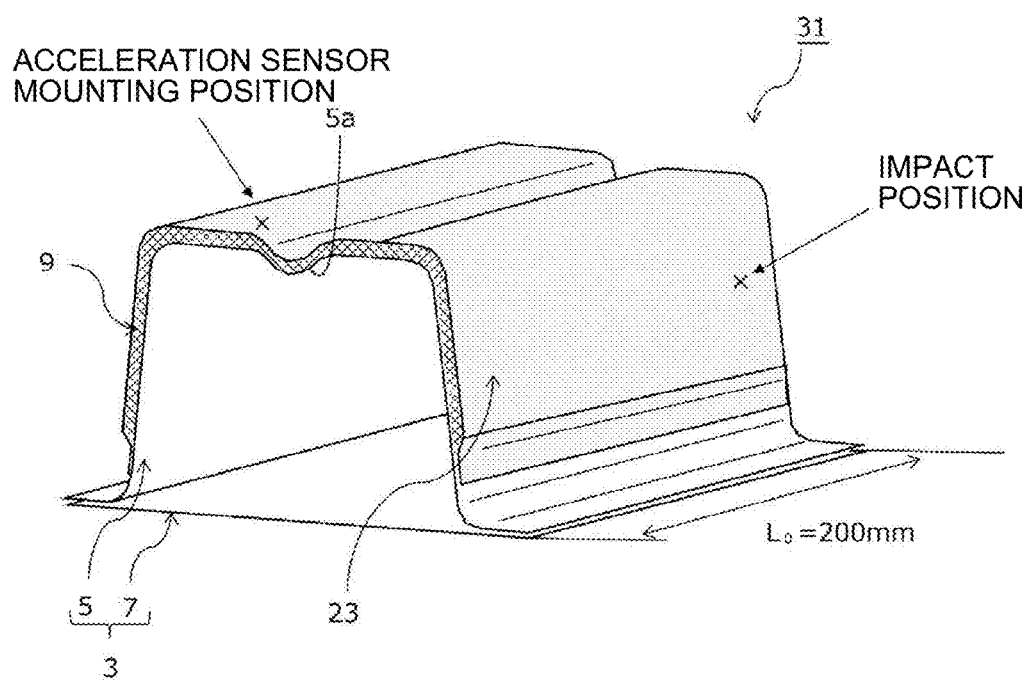
FIG. 10 is a diagram illustrating an impact vibration test method in the examples.

On the other hand, in the impact vibration test, as illustrated in FIG. 10, an acceleration sensor (NP-3211 manufactured by Ono Sokki Co., Ltd.) was mounted near an edge of the top portion of the separation prevention member 23 of the hung test specimen 31, and a side wall portion, which is a side opposite to the acceleration sensor mounting position, of the separation prevention member 23 of the test specimen 31 was hit and excited by an impact hammer (GK-3100 manufactured by Ono Sokki Co., Ltd.), and impact force and acceleration occurring in the test specimen 31 were put into an FFT analyzer (CF-7200A manufactured by Ono Sokki Co., Ltd.) to calculate a frequency response function.

Figure 11:
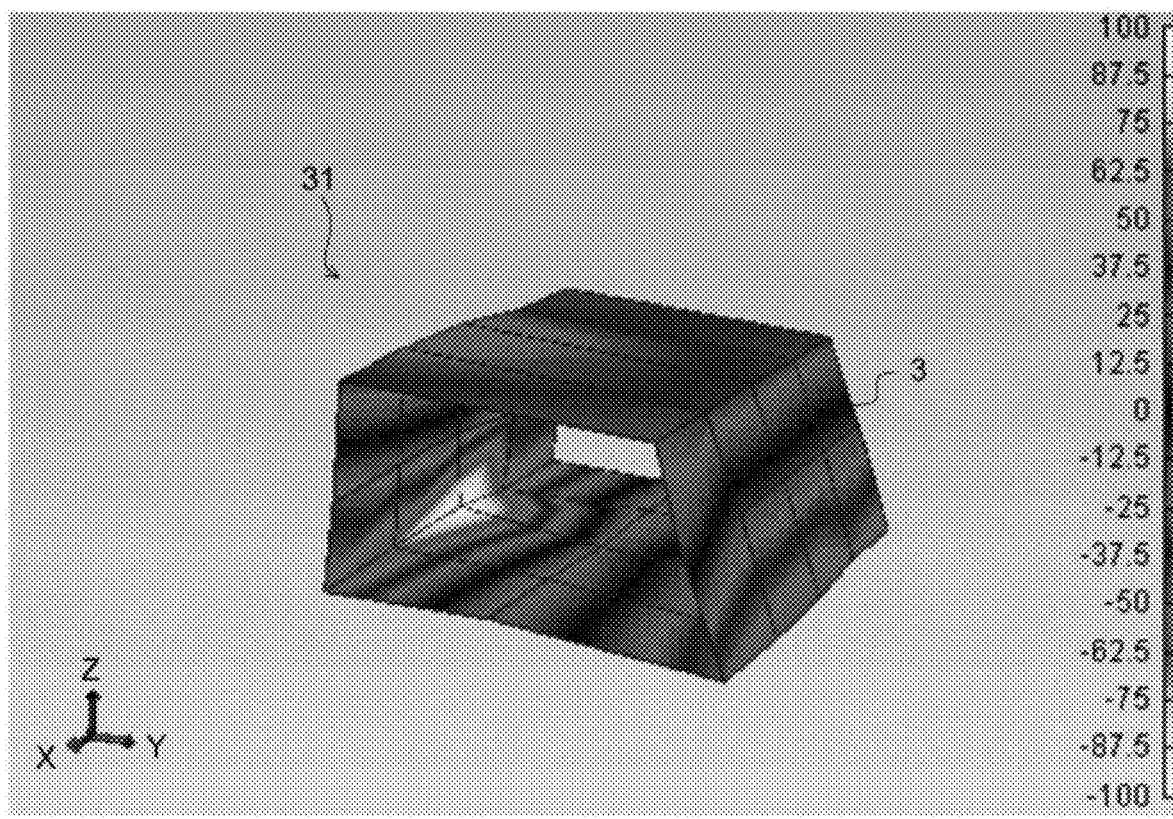
FIG. 11 is a diagram of a vibration mode as a target of calculation of a character frequency in vibration characteristic evaluation by the impact vibration test method in the examples.

The frequency response function was calculated by averaging procedure and curve fit by five impacts. Vibration mode analysis was performed by the calculated frequency response function to obtain a character frequency in the same mode. FIG. 11 illustrates a vibration mode as an object.

Figure 12:
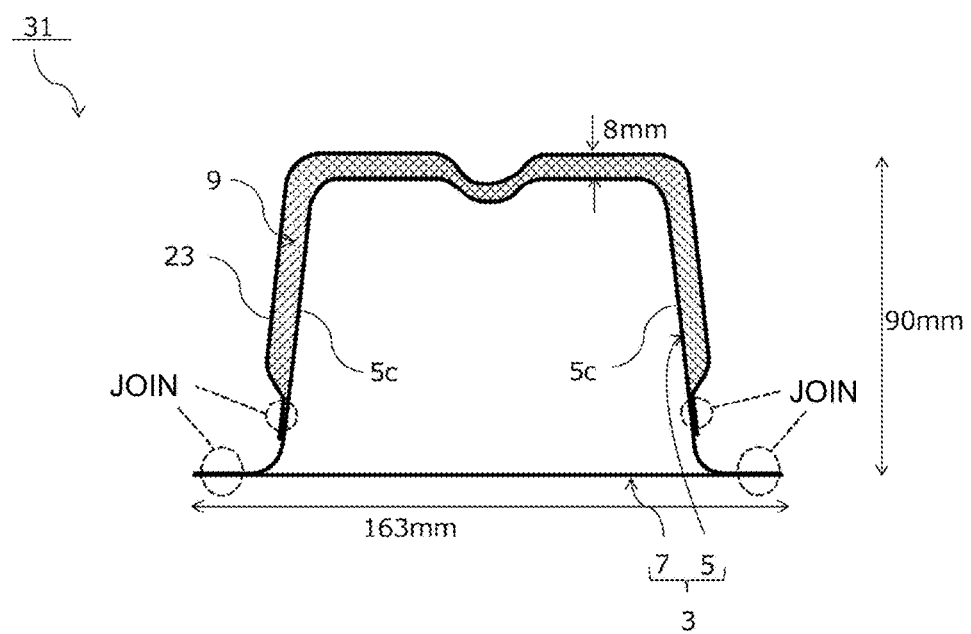
FIG. 12 is a diagram of a structure of a test specimen used as an inventive example in the examples (No. 1).
Figure 13:
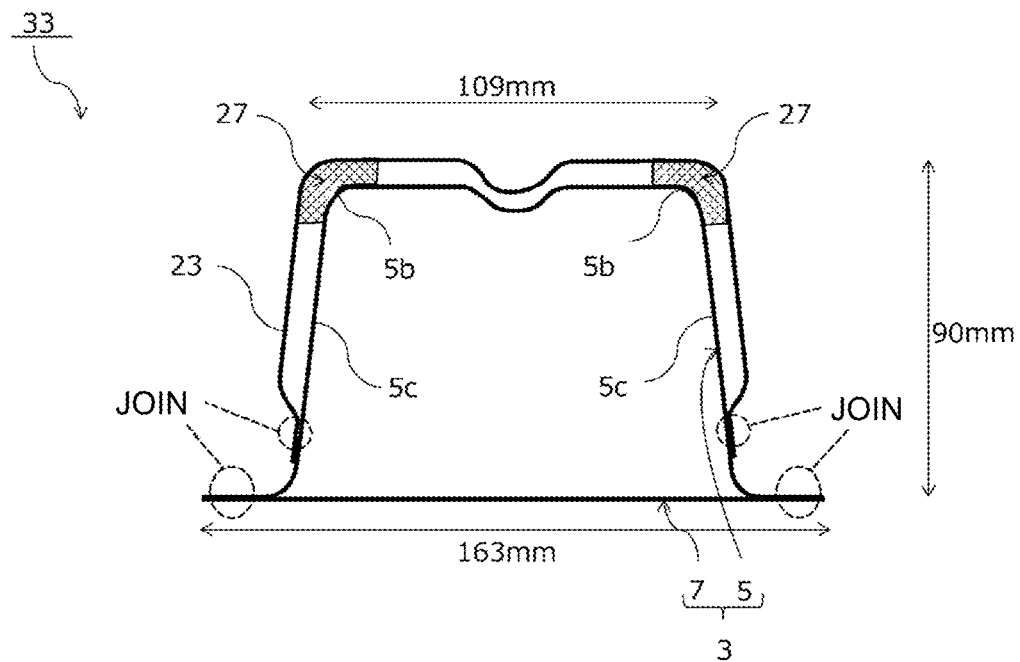
FIG. 13 is a diagram of a structure of a test specimen used as an inventive example in the examples (No. 2).
Figure 14:
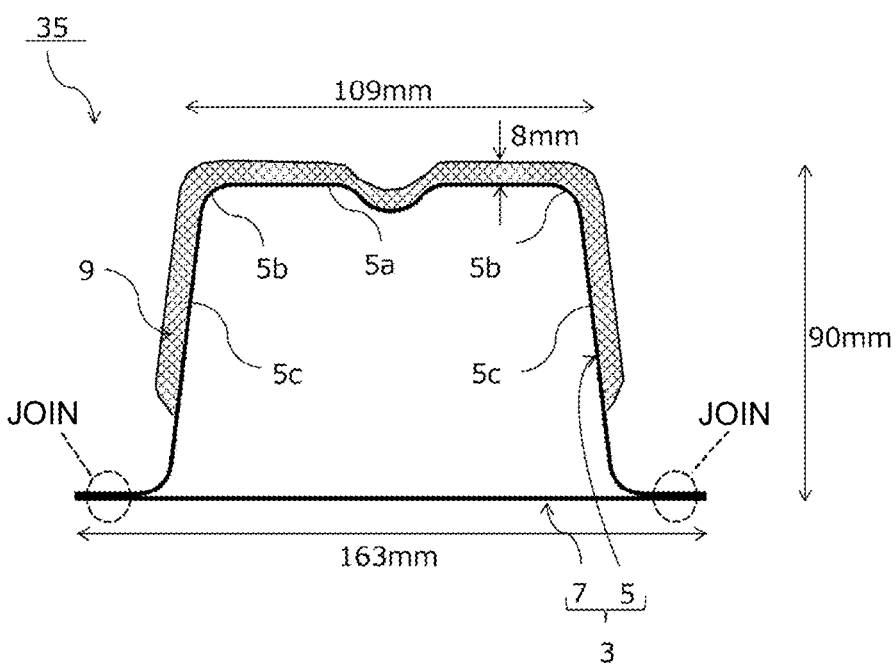
FIG. 14 is a diagram of a structure of a test specimen used as an inventive example in the examples (No. 3).

FIG. 12 to FIG. 14 illustrate the structures and the shapes of test specimens as inventive examples.

FIG. 12 is an aspect in which the automotive crashworthiness energy absorption part 21 according to the second embodiment of the present invention described above (FIG. 6 and FIG. 7) was prepared as the test specimen 31. The test specimen 31 has the tubular member 3 in which the outer part 5 and the inner part 7 are joined together by spot welding, and the separation prevention member 23 is joined to the outer surfaces of the side wall portions 5c of the outer part 5 so as to cover the resin 9 coated or patched on the outer surfaces of the top portion 5a, the punch shoulder R portions 5b, and the side wall portions 5c of the outer part 5.

FIG. 13 is an aspect in which the automotive crashworthiness energy absorption part 25 according to another aspect of the second embodiment of the present invention (FIG. 8(a)) was prepared as a test specimen 33. The test specimen 33, like the test specimen 31, has the tubular member 3 in which the outer part 5 and the inner part 7 are joined together by spot welding, the punch shoulder R portions 5b of the outer part 5 are coated or patched with the resin 27, and the separation prevention member 23 is provided so as to cover the surface of the resin 27 and is joined to the outer surfaces of the side wall portions 5c of the outer part 5.

FIG. 14 is an aspect in which the automotive crashworthiness energy absorption part 1 according to the first embodiment of the present invention described above (FIG. 1 and FIG. 2) was prepared as a test specimen 35. The test specimen 35 has the tubular member 3 in which the outer part 5 and the inner part 7 are joined together by spot welding, and the outer surfaces of the top portion 5a, the punch shoulder R portions 5b, and the side wall portions 5c of the outer part 5 are coated or patched with the resin 9.

The outer part 5 and the inner part 7 used for the test specimen 31, the test specimen 33, and the test specimen 35 illustrated in FIG. 12 to FIG. 14 all have the same shape and dimensions, with their test specimen length $L_0$ being 200 mm.

In the test specimen 31, the test specimen 33, and the test specimen 35, the resin 9 and the resin 27 were an epoxy-based or urethane-based foamed resin. The thickness of the resin 9 or the resin 27 provided as a coating or patch was 0.1 mm, 1 mm (FIG. 15(c)), 3 mm (FIG. 15(b)), or 8 mm (FIG. 15(a)) or less, and the adhesive strength between the outer surface of the outer part 5 and the resin 9 or the resin 27 was within the range of the present invention (10 MPa or more). For the adhesive strength of the present examples, the crashworthiness analysis of a doubled-layered square column in which the metal sheet used for the tubular member and the resin are bonded together was performed, and maximum sheared stress or average sheared stress acting on an interface between the metal sheet and the resin obtained by the crashworthiness analysis was employed.

Figure 16:
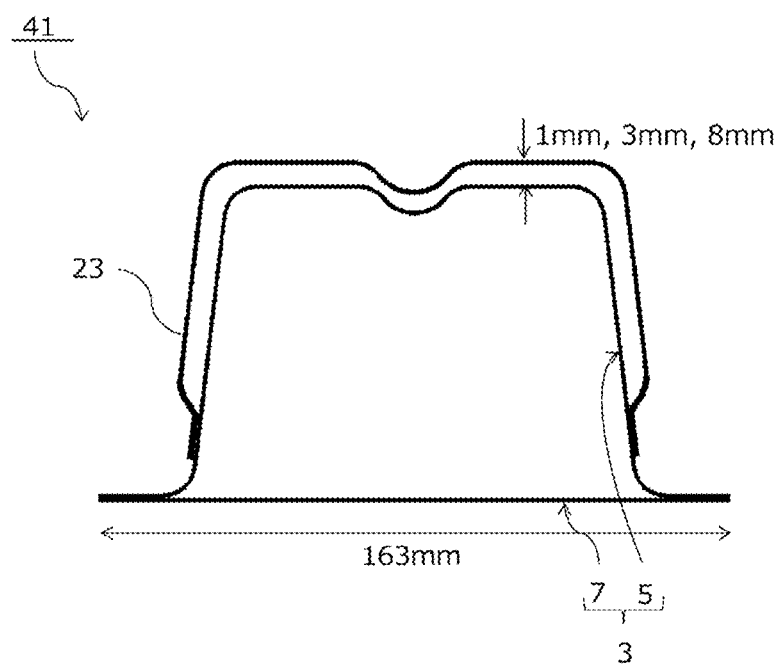
FIG. 16 is a diagram of a structure of a test specimen used as a comparative example in the examples.

Furthermore, in the present examples, comparative examples were provided using a test specimen 41 (FIG. 16) that has the same shape and the same dimensions as those of the tubular member 3 and the separation prevention member 23 of the inventive examples and is not coated or patched with resin, and the test specimen 31, the test specimen 33, or the test specimen 35 with an adhesive strength of the resin 9 or the resin 27 of less than 10.0 MPa which is smaller than the range of the present invention, and the axial crush test and the impulse impact test were performed on the comparative examples in the same manner as the inventive examples. Table 2 illustrates the respective conditions of the structure, the type of the resin, and the adhesive strength of the test specimens as the inventive examples and the comparative examples. For the area coated with the resin in Table 2, "Outer RF" indicates the top portion 5a and part of the side wall portions 5c of the outer part 5 and "Punch shoulder R" indicates the punch shoulder R portion 5b of the outer part 5.

TABLE 2

| | Structure | | | | | |
|---|---|---|---|---|---|---|
| | Outer part | | Separation prevention member | | Inner part | |
| | Material [MPa] | Sheet thickness [mm] | Material [MPa] | Sheet thickness [mm] | Material [MPa] | Sheet thickness [mm] |
| Inventive Example 1 | 590 | 1.2 | 270 | 0.5 | 590 | 1.2 |
| Inventive Example 2 | 590 | 1.2 | 270 | 0.5 | 590 | 1.2 |
| Inventive Example 3 | 1180 | 1.2 | 270 | 0.5 | 590 | 1.2 |
| Inventive Example 4 | 590 | 1.2 | 270 | 0.5 | 590 | 1.2 |
| Inventive Example 5 | 590 | 1.2 | 270 | 0.5 | 590 | 1.2 |
| Inventive Example 6 | 1180 | 1.2 | — | — | 590 | 1.2 |
| Inventive Example 7 | 1180 | 1.2 | 270 | 0.5 | 590 | 1.2 |
| Comparative Example 1 | 590 | 1.2 | 270 | 0.5 | 590 | 1.2 |
| Comparative Example 2 | 590 | 1.4 | 270 | 0.5 | 590 | 1.2 |
| Comparative Example 3 | 980 | 1.2 | 270 | 0.5 | 590 | 1.2 |
| Comparative Example 4 | 1180 | 1.2 | 270 | 0.5 | 590 | 1.2 |
| Comparative Example 5 | 1180 | 1.2 | 270 | 0.5 | 590 | 1.2 |
| Comparative Example 6 | 590 | 1.2 | 270 | 0.5 | 590 | 1.2 |
| Comparative Example 7 | 590 | 1.2 | 270 | 0.5 | 590 | 1.2 |

TABLE 2-continued

| | | | | | | |
|---|---|---|---|---|---|---|
| Comparative Example 8 | 1180 | 1.2 | — | — | 590 | 1.2 |
| Comparative Example 9 | 590 | 1.2 | 270 | 0.5 | 590 | 1.2 |

| | Resin application | | | | Test specimen weight [kg] | Resin adhesive strength [MPa] |
| | Presence or absence | Coating or patch | Thick-ness [mm] | Area | | |
|---|---|---|---|---|---|---|
| Inventive Example 1 | Present | Coating | 8 | Outer RF | 1.35 | 11.9 |
| Inventive Example 2 | Present | Coating | 1 | Outer RF | 1.18 | 12.1 |
| Inventive Example 3 | Present | Coating | 1 | Outer RF | 1.18 | 15.5 |
| Inventive Example 4 | Present | Coating | 3 | Punch shoulder R | 1.14 | 11.3 |
| Inventive Example 5 | Present | Coating | 3 | Outer RF | 1.22 | 10.4 |
| Inventive Example 6 | Present | Patch | 1 | Outer RF | 0.98 | 12.5 |
| Inventive Example 7 | Present | Patch | 0.1 | Outer RF | 1.11 | 12.5 |
| Comparative Example 1 | Absent | — | — | — | 1.09 | — |
| Comparative Example 2 | Absent | — | — | — | 1.20 | — |
| Comparative Example 3 | Absent | — | — | — | 1.09 | — |
| Comparative Example 4 | Absent | — | — | — | 1.10 | — |
| Comparative Example 5 | Present | Coating | 1 | Outer RE | 1.18 | 0.0 |
| Comparative Example 6 | Present | Coating | 3 | Punch shoulder R | 1.14 | 4.0 |
| Comparative Example 7 | Present | Coating | 3 | Outer RF | 1.29 | 9.0 |
| Comparative Example 8 | Present | Patch | 1 | Outer RF | 0.98 | 4.0 |
| Comparative Example 9 | Present | Coating | 9 | Outer RF | 1.41 | 0.0 |

| | Resin | | Presence or absence of fracture | Absorbed energy at test speed of 17.8 m/s | | Vibration characteristic (character frequency) [Hz] |
| | Resin type | Foaming ratio | | [kJ] | [KJ/kg] | |
|---|---|---|---|---|---|---|
| Inventive Example 1 | Urethane | 2 | Absent | 13.0 | 9.6 | 460 |
| Inventive Example 2 | Urethane | 2 | Absent | 9.6 | 8.1 | 340 |
| Inventive Example 3 | Urethane | 2 | Absent | 12.4 | 10.5 | 340 |
| Inventive Example 4 | Epoxy | 2 | Absent | 9.1 | 8.0 | 370 |
| Inventive Example 5 | Epoxy | 2 | Absent | 9.8 | 8.0 | 370 |
| Inventive Example 6 | Urethane | 2 | Absent | 11.3 | 11.5 | 355 |
| Inventive Example 7 | Urethane | 2 | Absent | 11.8 | 10.6 | 310 |
| Comparative Example 1 | — | — | Absent | 6.5 | 6.0 | 145 |
| Comparative Example 2 | — | — | Absent | 7.0 | 5.8 | 165 |
| Comparative Example 3 | — | — | Present | 8.1 | 7.4 | 145 |
| Comparative Example 4 | — | — | Present | 8.5 | 7.7 | 145 |
| Comparative Example 5 | Urethane | 2 | Present | 8.8 | 7.5 | 265 |
| Comparative Example 6 | Urethane | 2 | Present | 7.7 | 6.8 | 290 |
| Comparative Example 7 | Epoxy | 2 | Present | 8.6 | 6.7 | 298 |

TABLE 2-continued

| | | | | | | |
|---|---|---|---|---|---|---|
| Comparative Example 8 | Urethane | 2 | Present | 8.9 | 9.1 | 275 |
| Comparative Example 9 | Urethane | 2 | Present | 8.9 | 6.3 | 285 |

Inventive Example 1 to Inventive Example 7 have an adhesive strength of the resin of within the range of the present invention (10 MPa or more); Inventive Example 1 to Inventive Example 5 and Inventive Example 7 use the test specimen 31 or the test specimen 33, which is provided with the separation prevention member 23; and Inventive Example 6 uses the test specimen 35, which is not provided with any separation prevention member. On the other hand, Comparative Example 1 to Comparative Example 4 are not coated or patched with resin; and Comparative Example 5 to Comparative Example 7 have an adhesive strength of the resin out of the range of the present invention (less than 10 MPa).

Table 2 above illustrates the structure of the test specimens and the test specimen weight, results of the absorbed energy when the axial crush test was performed, and results of the character frequency obtained by the impact vibration test. The test specimen weight illustrated in Table 2 is the sum of the respective weights of the outer part 5, the inner part 7, the separation prevention member 23, and the resin 9 or the resin 27 for the test specimen 31 or the test specimen 33 coated with the resin 9 or the resin 27, and the sum of the respective weights of the outer part 5, the inner part 7, and the separation prevention member 23 for the test specimen 41 not coated or patched with resin.

Comparative Example 1 uses the test specimen 41 (FIG. 16) not coated with resin. The test specimen weight of Comparative Example 1 was 1.09 kg, the absorbed energy was 6.5 kJ, and the character frequency was 145 Hz.

Comparative Example 2 uses the test specimen 41 not coated with resin like Comparative Example 1 in which the sheet thickness of the outer part 5 is changed from 1.2 mm to 1.4 mm in. The test specimen weight of Comparative Example 2 was 1.20 kg, the absorbed energy was 7.0 kJ, and the character frequency was 165 Hz.

Comparative Example 3 uses the test specimen 41 having the same shape as that of Comparative Example 1 in which the outer part 5 is a 980 MPa-class high-strength steel sheet. The test specimen weight of Comparative Example 3 was 1.09 kg. The absorbed energy of Comparative Example 3 was 8.1 kJ, which increased from that of Comparative Example 1, but fracture occurred in the tubular member 3. The character frequency of Comparative Example 3 was 145 Hz.

Comparative Example 4 uses the test specimen 41 having the same shape as that of Comparative Example 1 in which the outer part 5 is a 1,180 MPa-class high-strength steel sheet. The test specimen weight of Comparative Example 4 was 1.10 kg. The absorbed energy of Comparative Example 4 was 8.5 kJ, which further increased from that of Comparative Example 3, but fracture occurred in the tubular member 3. The character frequency of Comparative Example 4 was 145 Hz.

Comparative Example 5 has the same shape as that of the test specimen 31 according to the present invention but the resin 9 with a thickness of 1 mm, the outer part 5, and the separation prevention member 23 are not bonded together to make the adhesive strength 0 MPa. The test specimen weight of Comparative Example 5 was 1.18 kg. Furthermore, the absorbed energy of Comparative Example 5 was 8.8 kJ, and fracture occurred in the tubular member 3. The character frequency of Comparative Example 5 was 265 Hz.

Comparative Example 6 has the same shape as that of the test specimen 33 according to the present invention and in which only the punch shoulder R portions 5*b* of the outer part 5 are coated with the resin 27 with a thickness of 3 mm and the adhesive strength between the resin 27 and the outer part 5 and the separation prevention member 23 is 4.0 MPa that is out of the range of the present invention. The test specimen weight of Comparative Example 6 was 1.14 kg. Furthermore, the absorbed energy of Comparative Example 6 was 7.7 kJ, and fracture occurred in the tubular member 3. The character frequency of Comparative Example 6 was 290 Hz.

Comparative Example 7 has the same shape as that of the test specimen 31 according to the present invention and in which the adhesive strength between the resin 9 and the outer part 5 and the separation prevention member 23 is 9.0 MPa that is out of the range of the present invention. The test specimen weight of Comparative Example 7 was 1.29 kg. Furthermore, the absorbed energy of Comparative Example 7 was 8.6 kJ, and fracture occurred in the tubular member 3. The character frequency of Comparative Example 7 was 298 Hz.

Comparative Example 8 has the same shape as that of the test specimen 35 according to the present invention and in which the adhesive strength of the resin 9 and the outer part 5 is 4.0 MPa that is out of the range of the present invention. The test specimen weight of Comparative Example 8 was 0.98 kg. Furthermore, the absorbed energy of Comparative Example 8 was 8.9 kJ, and fracture occurred in the tubular member 3. The character frequency of Comparative Example 8 was 275 Hz.

Comparative Example 9 has the same shape as that of the test specimen 31 according to the present invention and in which the resin 9 has a thickness of 9 mm that is out of the range of the present invention. The test specimen weight of Comparative Example 9 was 1.41 kg, the absorbed energy per unit weight was 8.9 kJ, and the character frequency was 285 Hz.

Figure 15:
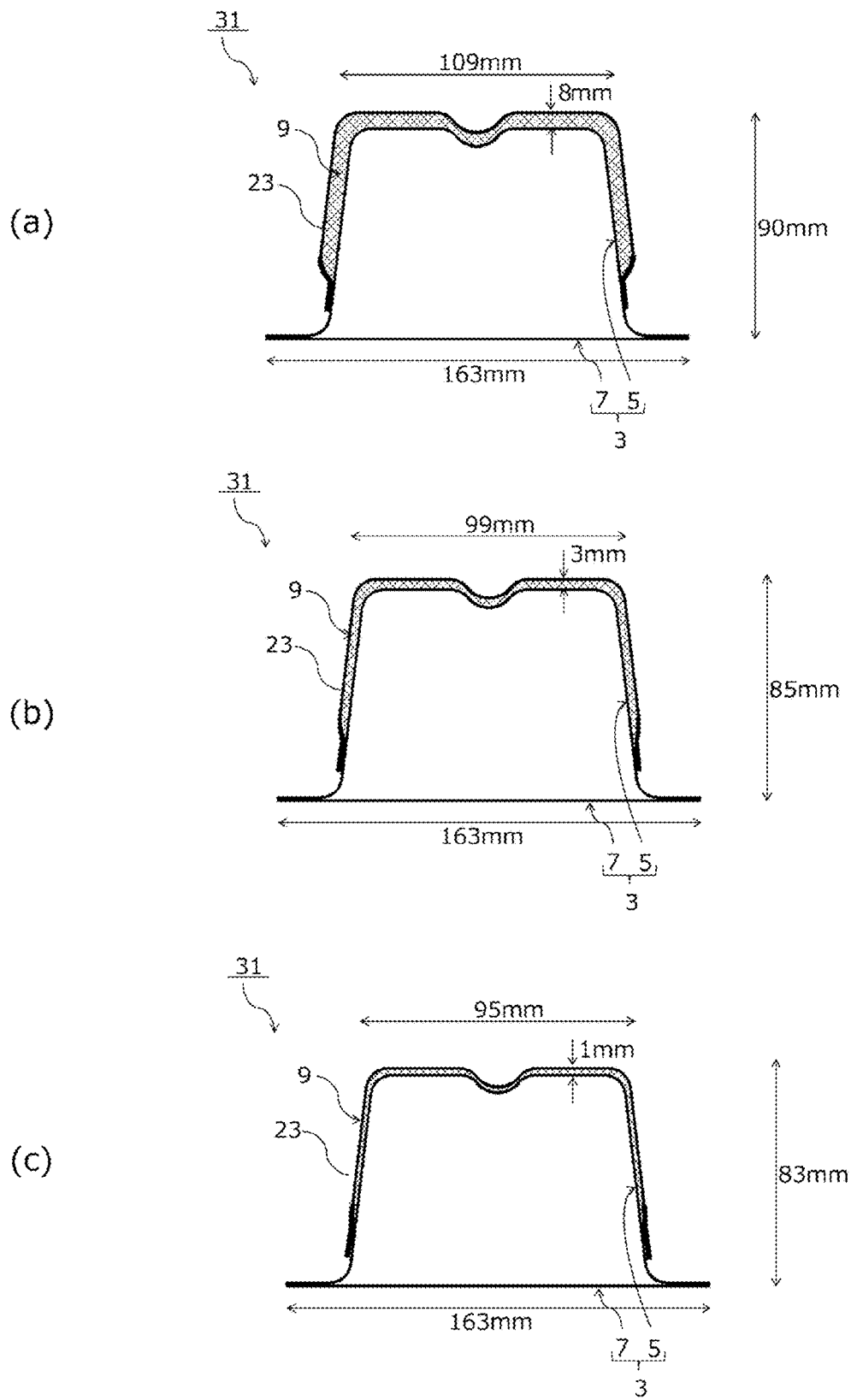
FIG. 15 is a diagram of a structure of a test specimen used as an inventive example in the examples (No. 4).

Inventive Example 1 uses the test specimen 31 (FIG. 15(*a*)) in which the outer part 5 is a steel sheet with a steel sheet strength of 590 MPa class, the resin 9 has a thickness of 8 mm and an adhesive strength of 11.9 MPa that is within the range of the present invention (10.0 MPa or more). The test specimen weight of Inventive Example 1 was 1.35 kg, which increased from the test specimen weight of Comparative Example 1 (=1.09 kg) made of the same material not coated or patched with resin. The absorbed energy of Inventive Example 1 was 13.0 kJ, which was greatly improved from the absorbed energy of 6.5 kJ of Comparative Example 1, and no fracture occurred in the tubular member 3. In addition, the absorbed energy was greatly improved as compared with the absorbed energy of Comparative Example 4 (=8.5 kJ) that uses the test specimen 41 in which the outer part 5 is a 1,180 MPa-class high-strength steel sheet. The absorbed energy per unit weight obtained by dividing the absorbed energy by the test specimen weight was 9.6 kJ/kg, which improved from that of Comparative Example 1 (=6.0 kJ/kg) and that of Comparative Example 4 (=7.7 kJ/kg). The character frequency of Inventive Example 1 was 460 Hz, which greatly increased from that of Comparative Example 1 (=145 Hz).

Inventive Example 2 uses the test specimen 31 (FIG. 15(c)) in which the outer part 5 is a steel sheet with a steel sheet strength of 590 MPa class and the resin 9 has a thickness of 1 mm. The absorbed energy of Inventive Example 2 was 9.6 kJ, which was lower than that of Inventive Example 1, but greatly improved as compared with the absorbed energy of Comparative Example 1 (=6.5 kJ), and no fracture occurred in the tubular member 3. The test specimen weight of Inventive Example 2 was 1.18 kg, which was lighter than the test specimen weight 1.35 kg of Inventive Example 1. The absorbed energy per unit weight of Inventive Example 2 was 8.1 kJ/kg, which improved from that of Comparative Example 1 (6.0 kJ/kg). The character frequency of Inventive Example 2 was 340 Hz, which was greatly increased from that of Comparative Example 1 (=145 Hz).

Inventive Example 3 uses the test specimen 31 that has the same shape as that of Inventive Example 2 and in which the outer part 5 is a high-strength steel sheet with a steel sheet strength of 1,180 MPa class. The absorbed energy of Inventive Example 3 was 12.4 kJ, which was slightly lower than that of Inventive Example 1, but greatly improved as compared with that of Comparative Example 1, and no fracture occurred in the tubular member 3. The test specimen weight of Inventive Example 3 was 1.18 kg, which was lighter than that of Inventive Example 1. The absorbed energy per unit weight of Inventive Example 3 was 10.5 kJ/kg, which was improved from that of Inventive Example 1 (=9.6 kJ/kg) and that of Comparative Example 1 (=6.0 kJ/kg). Fracture occurred in the tubular member 3 at the time of 50 mm-axial crush in Comparative Example 4, but no fracture occurred in the tubular member 3 in Inventive Example 3. This is because the resin 9 was coated on the outer part 5 and bonded thereto with an adhesive strength of 10 MPa or more, whereby the bending radius of the bellows-shaped buckling deformation was not the fracture limit for bending radius or less. The character frequency of Inventive Example 3 was 340 Hz, which was greatly increased from that of Comparative Example 4 (145 Hz) that uses the steel sheet of the same material as the outer part 5 but not coated with resin.

Inventive Example 4 uses the test specimen 33 in which the outer part 5 is a steel sheet with a steel sheet strength of 590 MPa class and only the punch shoulder R portions 5b of the outer part 5 are coated with the resin 27 with a thickness of 3 mm. The absorbed energy of Inventive Example 4 was 9.1 kJ, which was greatly improved as compared with the absorbed energy 6.5 kJ of Comparative Example 1. The test specimen weight of Inventive Example 4 was 1.14 kg, which was lighter than that of Inventive Example 1. The absorbed energy per unit weight of Inventive Example 4 was 8.0 KJ/kg, which was improved from that of Comparative Example 1 (=6.0 KJ/kg), and no fracture occurred in the tubular member 3. The character frequency of Inventive Example 4 was 370 Hz, which was greatly increased from the character frequency 290 Hz of Comparative Example 6 in which the adhesive strength of the resin 27 coated only on the punch shoulder R portions 5b of the outer part 5 was out of the range of the present invention.

Inventive Example 5 uses the test specimen 31 that has the same shape as that of Inventive Example 1 and in which the resin 9 has a thickness of 3 mm (FIG. 15(b)). The absorbed energy of Inventive Example 5 was 9.8 kJ, which was lower than that of Inventive Example 1, but greatly improved as compared with that of Comparative Example 1, and no fracture occurred in the tubular member 3. The test specimen weight of Inventive Example 5 was 1.22 kg, which was lighter than that of Inventive Example 1. The absorbed energy per unit weight of Inventive Example 5 was 8.0 kJ/kg, which was improved from the absorbed energy per unit weight 6.7 kJ/kg of Comparative Example 7 that uses the test specimen 31 with the adhesive strength out of the range of the present invention (=9.0 MPa). The character frequency of Inventive Example 5 was 370 Hz, which was improved from the character frequency 298 Hz of Comparative Example 7.

Inventive Example 6 uses the test specimen 35 in which the outer part 5 is coated with the resin 9 with a thickness of 1 mm without providing any separation prevention member. The test specimen weight of Inventive Example 6 was 0.98 kg. The absorbed energy of Inventive Example 6 was 11.3 kJ, and the absorbed energy per unit weight was 11.5 kJ/kg that is comparable to the energy absorptive property of Inventive Example 1 or more, and no fracture occurred in the tubular member 3.

Inventive Example 7 uses the test specimen 31 that has the same shape as that of Inventive Example 1 and in which the resin 9 has a thickness of 0.1 mm comparable to a laminate of a normal laminated steel sheet. The test specimen weight of Inventive Example 7 was 1.11 kg. The absorbed energy of Inventive Example 7 was 11.8 kJ, and the absorbed energy per unit weight thereof was 10.6 kJ/kg that is comparable to the energy absorptive property of Inventive Example 1 or more, and no fracture occurred in the tubular member 3.

Accordingly, the automotive crashworthiness energy absorption part according to the present invention can efficiently improve the crashworthiness energy absorptive property when receiving input of a crashworthiness load in the axial direction to undergo axial crush while reducing a weight increase and increase the character frequency, and can thus improve the vibration-damping properties when an impact is applied.

The reason why the vibration-damping properties is improved by the increase in the character frequency is as follows. When the character frequency of the tubular member 3 as a crashworthiness member such as the front side member described above falls within a frequency range of the vibrations of an engine installed on the member, sympathetic vibrations occur to increase the vibrations. When the engine revolves at 4,000 rpm, which is a high revolution range of normal traveling, for example, a crankshaft revolves at the same number of revolutions; a four-cycle engine explodes once per two revolutions per cylinder and thus vibrates 2,000 times per minute (33.3 times per second), which gives a vibration frequency of 133 Hz for a four-cylinder engine, 200 Hz for a six-cylinder engine, and 267 Hz for an eight-cylinder engine. Thus, the character frequency of about 300 Hz or more of the present invention can surely prevent the sympathetic vibrations to improve the vibration-damping properties.

INDUSTRIAL APPLICABILITY

According to the present invention, an automotive crashworthiness energy absorption part, such as a front side member or a crash box, that improves, by an outer surface coated with resin, the effect of absorbing crashworthiness energy when undergoing axial crush with receiving input of a crashworthiness load from the front or the rear of an automotive body, and is capable of functioning as a damping material that absorbs vibrations occurring in the automotive body and a method for manufacturing the same can be provided.

REFERENCE SIGNS LIST

1 AUTOMOTIVE CRASHWORTHINESS ENERGY ABSORPTION PART
3 TUBULAR MEMBER
5 OUTER PART
5a TOP PORTION
5b PUNCH SHOULDER R PORTION
5c SIDE WALL PORTION
7 INNER PART
9 RESIN
11 AUTOMOTIVE CRASHWORTHINESS ENERGY ABSORPTION PART
13 RESIN
15 AUTOMOTIVE CRASHWORTHINESS ENERGY ABSORPTION PART
17 RESIN
21 AUTOMOTIVE CRASHWORTHINESS ENERGY ABSORPTION PART
23 SEPARATION PREVENTION MEMBER
25 AUTOMOTIVE CRASHWORTHINESS ENERGY ABSORPTION PART
26 AUTOMOTIVE CRASHWORTHINESS ENERGY ABSORPTION PART
27 RESIN
31 TEST SPECIMEN (INVENTIVE EXAMPLE)
33 TEST SPECIMEN (INVENTIVE EXAMPLE)
35 TEST SPECIMEN (INVENTIVE EXAMPLE)
41 TEST SPECIMEN (COMPARATIVE EXAMPLE)

The invention claimed is:

1. An automotive crashworthiness energy absorption part for being provided at a front part or a rear part of an automotive body and absorbing crashworthiness energy by undergoing axial crush when receiving input of a crashworthiness load from a front or a rear of the automotive body, the automotive crashworthiness energy absorption part comprising:
a tubular member formed of a metal sheet configured to absorb crashworthiness energy by undergoing axial crush in a longitudinal direction of the tubular member and by repeatedly causing bellows-shaped buckling deformation on the tubular member, the tubular member including a top portion and side wall portions continuous with the top portion; and
resin coated or patched on first outer surfaces including at least outer surfaces of the top portion and the side wall portions of the tubular member, wherein
the coated or patched resin has a thickness of 8 mm or less after being heated, forms at least part of a peripheral wall portion of a closed cross section space, and is bonded to the first outer surfaces with an adhesive strength of 10 MPa or more, and
the coated or patched resin is interposed between parts of the metal sheet in a bending portion deformed in a convex shape when the tubular member undergoes the buckling deformation.

2. The automotive crashworthiness energy absorption part according to claim 1, further comprising a separation prevention member that covers a surface of the resin and is joined to second outer surfaces of the side wall portions in order to prevent the resin from separating from the first outer surfaces, wherein
the separation prevention member has lower material strength than the tubular member, and
the resin is also bonded to the separation prevention member with an adhesive strength of 10 MPa or more.

3. A manufacturing method of an automotive crashworthiness energy absorption part for manufacturing an automotive crashworthiness energy absorption part including a tubular member formed of a metal sheet provided at a front part or a rear part of an automotive body and configured to absorb crashworthiness energy by undergoing axial crush in a longitudinal direction of the tubular member and by repeatedly causing bellows-shaped buckling deformation on the tubular member when receiving input of a crashworthiness load from a front or a rear of the automotive body, the tubular member including a top portion and side wall portions continuous with the top portion, the manufacturing method comprising:
a step of coating or patching an outer surface of the tubular member with resin having a thickness of 8 mm or less; and
a step of performing heat treatment on the tubular member coated or patched with the resin on certain conditions to bond the resin to the outer surface of the tubular member with an adhesive strength of 10 MPa or more,
wherein the coated or patched resin is interposed between parts of the metal sheet in a bending portion deformed in a convex shape when the tubular member undergoes the buckling deformation.

4. A manufacturing method of an automotive crashworthiness energy absorption part for manufacturing the automotive crashworthiness energy absorption part according to claim 2, the manufacturing method comprising:
a step of coating or patching the first outer surfaces of the tubular member with resin having a thickness of 8 mm or less;
a step of providing the separation prevention member preventing the resin coated or patched on the first outer surfaces from separating from the first outer surfaces so as to cover a surface of the resin to join the separation prevention member to the second outer surfaces of the side wall portions; and
a step of performing heat treatment on the tubular member coated or patched with the resin on certain conditions to bond the resin to each of the outer first surfaces of the tubular member and the separation prevention member with an adhesive strength of 10 MPa or more,
wherein the separation prevention member has lower material strength than the tubular member.

5. A manufacturing method of an automotive crashworthiness energy absorption part for manufacturing the automotive crashworthiness energy absorption part according to claim 2, the manufacturing method comprising:
a step of coating or patching the resin having a thickness of 8 mm or less on the separation prevention member preventing the resin from separating from the first outer surfaces;
a step of bringing the resin of the separation prevention member coated or patched with the resin into contact with the first outer surfaces of the tubular member and joining the separation prevention member to the second outer surfaces; and a step of performing heat treatment on the tubular member in which the separation prevention member is joined to the second outer surfaces on certain conditions to bond the resin to each of the first outer surfaces and the separation prevention member with an adhesive strength of 10 MPa or more.

\* \* \* \* \*